(12) United States Patent
Fan

(10) Patent No.: US 10,858,017 B2
(45) Date of Patent: Dec. 8, 2020

(54) METHOD OF CONTROLLING VEHICLE TO PERFORM SOFT LANDING, AND RELATED CONTROLLER AND SYSTEM

(71) Applicant: Donglei Fan, Sunnyvale, CA (US)

(72) Inventor: Donglei Fan, Sunnyvale, CA (US)

(*) Notice: Subject to any disclaimer, the term of this patent is extended or adjusted under 35 U.S.C. 154(b) by 35 days.

(21) Appl. No.: 16/051,151

(22) Filed: Jul. 31, 2018

(65) Prior Publication Data

US 2020/0039543 A1 Feb. 6, 2020

(51) Int. Cl.

| | |
|---|---|
| *B61L 27/04* | (2006.01) |
| *B61L 3/00* | (2006.01) |
| *B60L 15/20* | (2006.01) |
| *B61L 27/00* | (2006.01) |
| *G06F 17/12* | (2006.01) |
| *G06F 17/16* | (2006.01) |
| *G06F 16/29* | (2019.01) |
| *G06F 16/22* | (2019.01) |

(52) U.S. Cl.
CPC .......... *B61L 3/006* (2013.01); *B60L 15/2009* (2013.01); *B61L 3/008* (2013.01); *B61L 27/0027* (2013.01); *B61L 27/04* (2013.01); *G06F 16/2237* (2019.01); *G06F 16/29* (2019.01); *G06F 17/12* (2013.01); *G06F 17/16* (2013.01); *B60L 2200/26* (2013.01)

(58) Field of Classification Search
CPC .......... B61L 3/008; B61L 27/04; B61L 3/006; B61L 27/0038; B60W 2050/0013; B60W 2510/18; B60L 15/2009
See application file for complete search history.

(56) References Cited

U.S. PATENT DOCUMENTS

| | | | |
|---|---|---|---|
| 9,387,866 B1 | 7/2016 | Di Cairano et al. | |
| 9,517,780 B2* | 12/2016 | Jung | B61C 17/12 |
| 9,669,811 B2* | 6/2017 | Brooks | B60T 8/171 |
| 10,053,120 B2* | 8/2018 | Brooks | B60L 15/38 |
| 2011/0184619 A1* | 7/2011 | Kamata | B61L 3/121 |
| | | | 701/70 |
| 2016/0244077 A1 | 8/2016 | Di Cairano et al. | |
| 2018/0037243 A1* | 2/2018 | Danielson | B60W 30/146 |
| 2018/0366005 A1* | 12/2018 | Seenumani | B61L 15/0036 |
| 2020/0039543 A1* | 2/2020 | Fan | B61L 27/0027 |

OTHER PUBLICATIONS

Danielson et al., "Robust Soft-Landing Control with Quantized Input", *IFAC-Papers Online*, vol. 49, No. 18, 2016, pp. 35-40.
(Continued)

*Primary Examiner* — Zachary L Kuhfuss
(74) *Attorney, Agent, or Firm* — Staas & Halsey LLP

(57) ABSTRACT

A method of controlling a vehicle to soft-land at a target destination includes: determining a terminal set, which is a set of system states of the vehicle under which the vehicle will converge to a target set under constant zero control input; determining a sequence of polytopes, each polytope being an approximation of a backward reachable set of system states of the vehicle; and controlling the vehicle to reach the destination based on the determined polytopes. The method may be performed by one or more controllers.

20 Claims, 17 Drawing Sheets

(56) References Cited

OTHER PUBLICATIONS

Yoshimoto et al., "A Feasibility Study of Train Automatic Stop Control Using Range Sensors", *2001 IEEE Intelligent Transportation Systems Conference Proceedings*, Aug. 2001, pp. 802-807.
Bryson et al., "Applied Optimal Control: Optimization, Estimation, and Control", *Taylor & Francis Group*, 1975, pp. 136-137.
Danielson et al., "Robust Soft-Landing Control with Quantized Input", Aug. 2016, pp. 35-40.
Yoshimoto et al., "A Feasibility Study of Train Automatic Stop Control Using Range Sensors", Aug. 2001, pp. 802-807.
Bryson et al., "Applied Optimal Control: Optimization, Estimation, and Control", Jan. 1975, pp. 136-137.

\* cited by examiner $R^{(1)}$ v

Shrink polytope V to V$^{prime}$

US 10,858,017 B2

METHOD OF CONTROLLING VEHICLE TO PERFORM SOFT LANDING, AND RELATED CONTROLLER AND SYSTEM

BACKGROUND

The present disclosure relates generally to automated control systems for transportation vehicles, and, in particular, to such a control system configured to control transportation vehicles to perform soft-landing.

In soft landing, a vehicle, such as a train, slows down when approaching a destination and arrives at the destination at zero velocity. The destination may be a desired position or window of positions at which the vehicle is to stop. Automated control of vehicles to perform soft landing is a technological process used in various automated control systems for transportation vehicles, including train automatic stop control (TASC) systems, automatic train operation (ATO) systems, and automated driving systems.

SUMMARY

A first aspect of the disclosure is a method of controlling a vehicle to soft-land at a target destination represented by a target set, the vehicle being controllable according to a control input set. The method includes: determining a terminal set of system states of the vehicle under which the vehicle will converge to the target set under a constant zero control input state, each of the system states of the terminal set including a position-and-velocity state of the vehicle that is within a state constraint set, the state constraint set defining minimum and maximum velocities of the vehicle to reach the target set from respective positions; and determining a sequence of polytopes, each of the polytopes representing a respective plurality of system states of the vehicle that are backward reachable from a respective target-state set, which is the terminal set for a first polytope in the sequence and is a previous-in-sequence polytope for each subsequent polytope in the sequence.

In the method, each respective polytope in the sequence of polytopes is determined by a polytope-determining process comprising: determining a backward reachable set from which the respective target-state set is reachable by an input or a sequence of inputs within the control input set, and approximating the backward reachable set with an approximate polytope that is a subset of the backward reachable set, the approximate polytope being determined as the respective polytope in the sequence of polytopes. The determined sequence of polytopes includes a polytope including a current system state of the vehicle.

The method further includes: controlling the vehicle to drive the vehicle from the current system state, through a trajectory of system states of the vehicle, and to a state in the terminal set, the trajectory passing through system states of the vehicle respectively represented by polytopes of a reverse sequence of the sequence of polytopes; and upon determining that the vehicle has reached the terminal set, controlling the vehicle to a constant zero control input state such that the vehicle arrives at the target set.

A second aspect of the disclosure is a system to control a vehicle to soft-land at a target destination represented by a target set. The system includes one or more controllers configured to perform operations included in the method according to the first aspect.

The one or more controllers may include a controller off-board the vehicle, configured to perform the determining the terminal set and the determining the sequence of polytopes; and a controller on-board the vehicle, configured to perform the controlling the vehicle to drive the vehicle and the controlling the vehicle to the constant zero control input state are performed.

Another aspect of this disclosure is a method that includes: determining a terminal set of system states of the vehicle under which the vehicle will converge to a target set under a constant zero control input state, each of the system states of the terminal set including a position-and-velocity state of the vehicle that is within a state constraint set. The target set represents a target destination at which the vehicle is to soft-land, and the state constraint set defines minimum and maximum velocities of the vehicle to reach the target set from respective positions.

DESCRIPTION OF EMBODIMENTS

Hereinafter, various embodiments will be described. The description and illustrations are illustrative in nature and are not intended to limit the scope of the claims. Furthermore, it should be understood that details may be omitted when not necessary to understand the embodiments.

In this disclosure, the symbol ⊂ and the term "subset" generally do not require a proper (i.e., strict) subset, and may be satisfied by the two sets being equal. For example, "A⊂B" and "A is a subset of B" are satisfied when the set A is be less than or equal to the set B. Nonetheless, whenever a set is described as being subset of a second set using the above symbol or the term "subset," the description is considered to have also specifically disclosed the situation in which the set is a proper subset of the second set.

In this disclosure, the singular forms of terms (including terms preceded by "a" or "an") have a scope of one or more of the referents, unless the context clearly indicates otherwise. The term "or" generally has the meaning of an inclusive "or," as opposed to a mutually-exclusive "or," unless the context clearly indicates otherwise. The phrase "a position-and-velocity state of a vehicle" refers to a state defined by the combination of at least a position of the vehicle and a velocity of the vehicle.

In this disclosure, a "polytope" may be satisfied by any set or collection of mathematical quantities and/or mathematical relations that is sufficient to define a polytope for purposes of practicing embodiments of this disclosure, such as a set or collection of the vertices of the polytope and/or a set or collection of mathematical inequalities that define the faces of the polytope. For example, the operation of "determining a polytope" may be satisfied by determining the vertices of the polytope (e.g., in the form of a set of points within a certain space, such as a state space), and may also be satisfied by determining a set of inequalities that define the faces of the polytope.

Embodiments of this disclosure relate to controlling a transportation vehicle to soft-land at a target destination. The vehicle may have quantized inputs for its propulsion and braking system. An example of a vehicle with quantized inputs for propulsion and braking is a train moving along a fixed track.

Figure 1:
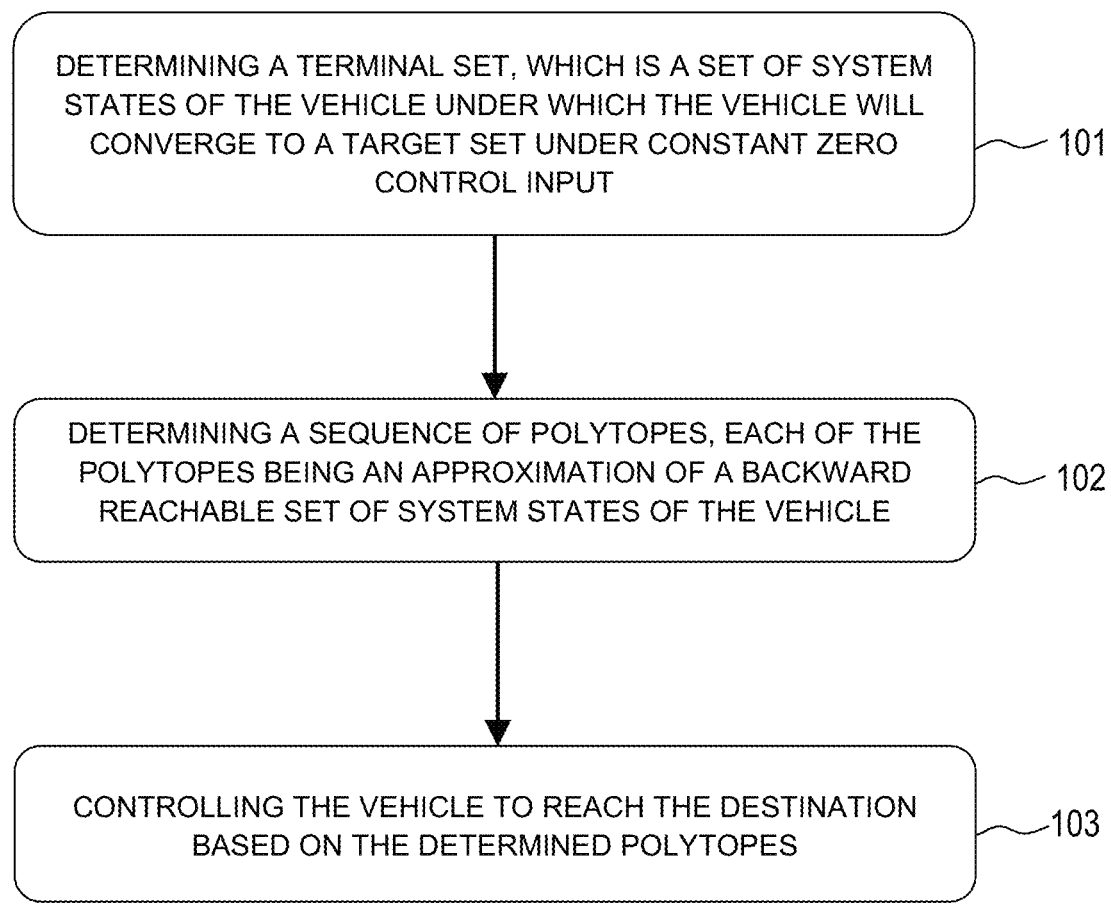
FIG. 1 is a flowchart for a method, according to the present disclosure, of controlling a vehicle to soft-land.

FIG. 1 illustrates a method of controlling a vehicle to soft-land at a target destination. The method includes: determining a terminal set, which is a set of system states of the vehicle under which the vehicle will converge to a target set under constant zero control input (operation 101); determining a sequence of polytopes, each of the polytopes being an approximation of a backward reachable set of system states of the vehicle (operation 102); and controlling the vehicle to reach the destination based on the determined polytopes (operation 103). The vehicle may be a train or other transportation vehicle, as discussed in the preceding paragraph. A "system state of a vehicle" may, for example, include a position-and-velocity state of the vehicle together with a state of at least one engine and braking system of the vehicle.

Figure 2A:
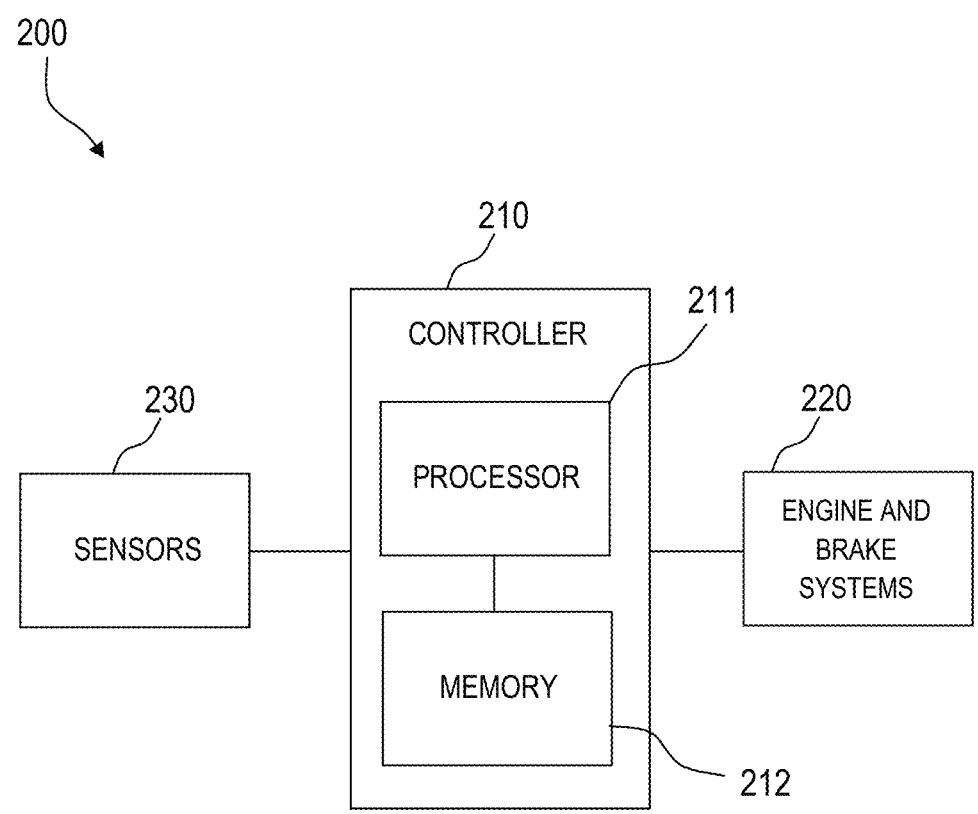
FIGS. 2A-2B illustrate systems to implement the method of FIG. 1.

FIG. 2A illustrates an example of a system to control a vehicle to soft-land at a target destination that may be used to implement the method shown in FIG. 1. The system 200 may include a controller 210, one or more engine and brake systems 220 controlled by the controller 210, and one or more sensors 230. The controller 210 may be configured, by any combination of hardware and software, to perform or cause the system 200 to perform any of the operations shown in FIG. 1, and, in general, any controller-implementable process, operation and functionality discussed in this disclosure. The controller 210 shown in FIG. 2A may be a single controller or a plurality of controllers. In the case of a plurality of controllers, different parts of the method shown in FIG. 1 may be performed by different respective controllers. In some embodiments, the controller 210 is on-board the vehicle. In other embodiments, the controller 210 comprises a controller on-board the vehicle and a separate off-board controller. The one or more engine and brake systems 220 are part of the vehicle and are configured to physically drive the vehicle.

The one or more sensors 230 are configured to obtain information, pertaining to movement-related parameters of the vehicle, that enable detection of the position and speed (or velocity) of the vehicle by the controller 210, and to provide the information to the controller 210. The one or more sensors 230 may sense speed, direction, and/or distance (to a certain object), for example. Such sensors may be attached to or integrated into the vehicle so as to be moving together with the vehicle, but may also be off-board (external to the vehicle). The one or more sensors 230 may be implemented as a combination of attached/integrated sensors and off-board sensors, and may be a combination of sensors configured to track different parameters of the vehicle. An off-bard sensor may, for example, be mounted to a train station or other fixed structure, and may be coupled to a transmitter to transmit the information the controller 210 or any component on the train.

Each of the one or more engine and brake systems 220 may comprise an engine (or motor) and a drivetrain to propel the vehicle forward, and brakes to slow down the vehicle. Both the engine and the brakes are controlled by the controller 210. Neither the engine nor the brakes are limited to any particular type. Additionally, within an engine and brake system, the brakes and engine may have separate, shared, and/or the same components. For example, the brakes may be an engine break. For example, the engine may be an electric engine that is able to generate a torque to actively cause the vehicle to decelerate.

In this disclosure, the term "actuator" is sometimes used to denote an engine and brake system, since an engine and brake system actuates the vehicle by propelling it forward or slowing it down. An engine and brake system may also be referred to as a propulsion and braking system. If the vehicle is embodied as a train, the one or more engine and brake systems 220 may also be referred to as one or more traction and brake systems. The train may also have multiple engines, each with its own braking system, so as to have a plurality of engine and brake systems 220.

The one or more engine and brake systems may be a plurality of actuators including a first actuator and a second actuator, each having quantized actuator inputs. The first actuator may be a pneumatic actuator, and the second actuator may be an electric actuator. The plurality of actuators may have different characteristics. For example, the pneumatic actuator may act slower than the electric actuator but have a higher force (a higher gain) than that of the electric actuator. For example, the pneumatic actuator may comprise a pneumatic braking system and a first engine of the vehicle. The electric actuator may comprise an electric engine, serving as a second engine of the vehicle and having the ability to engine brake.

The controller 210 may comprise at least one hardware processor 211 configured (e.g., programmed) to implement various functionalities of the controller. For example, the at least one processor may be configured to compute drive signals for driving the one or more engine and brake systems 220. The controller 210 may have interfaces to input signals from the one or more sensors 230, and to output drive signals to the one or more engine and brake systems 220. The controller 210 may include a memory 212 to which the at least one processor is coupled. The particular type of controller may depend on the type of vehicle. If the vehicle is embodied as a train, the controller 210 (or part thereof located on the vehicle) may be a train control system. If the vehicle is embodied as a road vehicle, the controller 210 (or part thereof located on the vehicle) may include one or more electronic control units (ECU). Examples of ECUs include a engine control module (ECM), a powertrain control module (PCM), a transmission control module (TCM), and a brake control module.

Figure 2B:
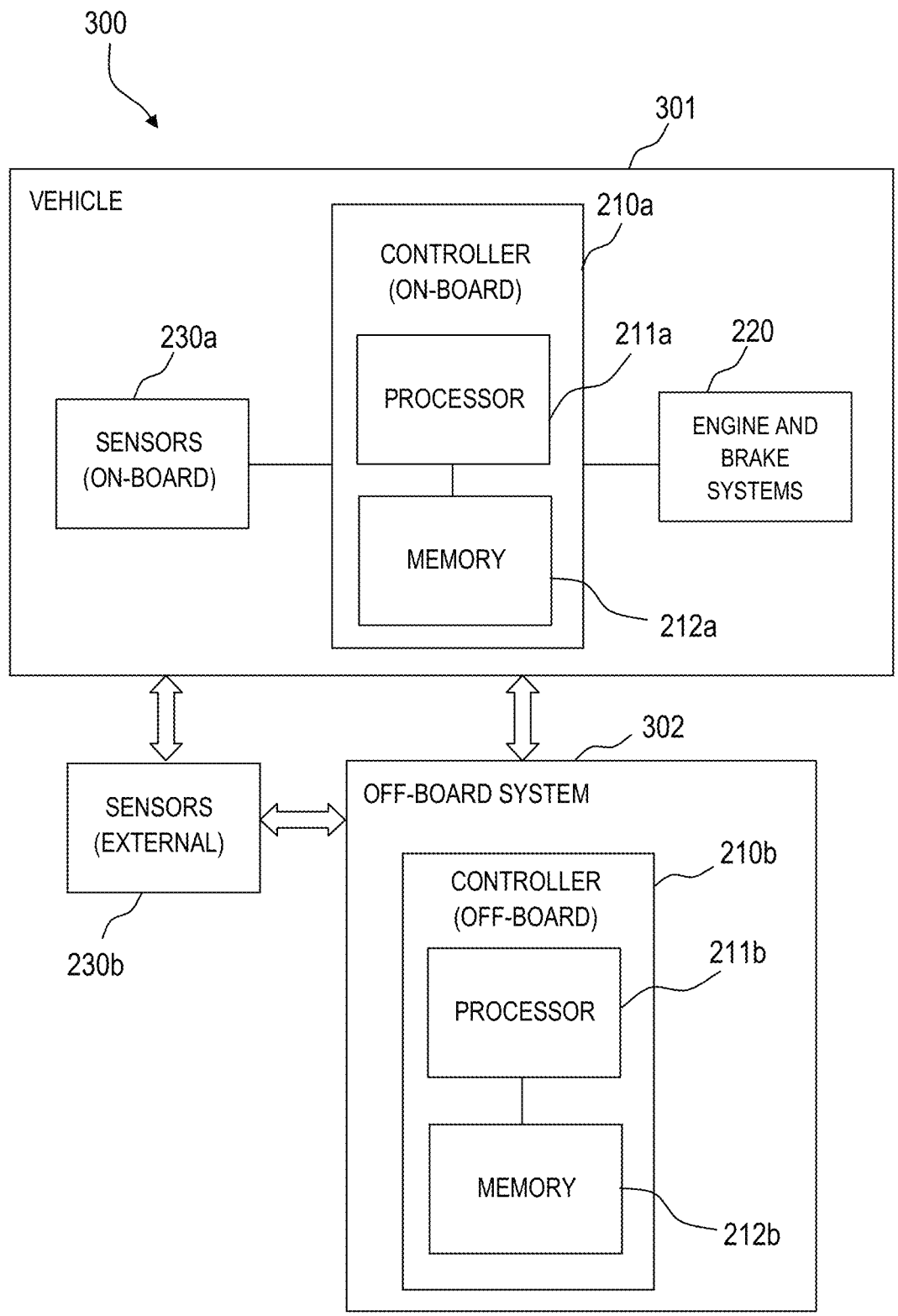

FIG. 2B shows a system 300 that is a more particular configuration of system 200 shown in FIG. 2A. In system 300, controller 210 of FIG. 2A is implemented as separate on-board and off-board controllers 211a, 211b. That is, the functionalities associated with controller 210 of FIG. 2A are now split between a controller 211a on-board a vehicle 301, and an off-board controller 210b part of an off-board system 302. The off-board system 302 may communicate with the vehicle through wireless communication, which may be implemented by a 4G LTE or other telecommunications system. To implement communication between the controller 210a and the off-board controller 210b, the vehicle may have a transceiver (or a transmitter and a receiver) controlled by processor 211a and configured to send and receive information to and from the off-board system 301. The off-board system 302 may likewise have a transceiver (or a transmitter and receiver) controlled by processor 211b and configured to send and receive information to and from the vehicle 301. FIG. 2B also shows off-board sensors 230b implemented in conjunction with on-board sensors 230a. The off-board sensors may be in wireless communication with the vehicle 301 and the off-board system 302.

For the example of a train moving along a fixed track and having a pneumatic actuator and an electric actuator, the system dynamics of the train may be represented using the following expression, which appears in C. Danielson and S. Di Cairano, "Robust soft-landing control with quantized input," *IFAC-PapersOnLine*, vol. 49, no. 18, pp. 35-40, 2016:

$$\dot{x}(t) = \begin{bmatrix} 0 & 1 & 0 \\ 0 & -\frac{b}{m} & \frac{k_a}{m} \\ 0 & 0 & -\frac{1}{\tau_a} \end{bmatrix} x(t) + \begin{bmatrix} 0 & 0 \\ 0 & -\frac{k_e}{m} \\ \frac{1}{\tau_a} & 0 \end{bmatrix} u(t), \quad (1)$$

where the system state $x(t)=[x_{m,1}(t) \; x_{m,2}(t) \; x_{m,2}(t)]^T \in \mathbb{R}^3$, the control input $u(t)=[q_e(t) \; q_a(t)]^T \in \mathcal{U}$, and the time index $t \geq 0$. $x_{m,1}(t)$ and $x_{m,2}(t)$ are the position and velocity of the vehicle, respectively, and $q_e(t)$ is the control input of the electric actuator. $x_q(t)$ and $q_a(t)$ are the state and the control input of the pneumatic actuator, respectively. $x(t)$, as expressed above, is an example of a system state of the vehicle, and $x_q(t)$ is an example of a state of at least one engine and braking system of the vehicle. m, b, $\tau_a$, $k_a$, $k_e$ are parameters of the vehicle as follows: m is the mass of the vehicle, b is the viscous friction coefficient, $\tau_a$ is the time-constant of the pneumatic acutator, $k_a$ is the gain of the penumatic actuator, and $k_e$ is the gain of the electric actuator. In example embodiments, $k_a$ is larger than $k_e$. The control input set $\mathcal{U} \subset \mathbb{R}^2$ is discrete. An example control input set is $\mathcal{U} = \{0,1,-1\} \times \{0,1,-1,0.5,-0.5\}$, where $\mathcal{U}$ represents that the electric actuator can switch between forward (1), idle (0), and braking (-1); similarly, the pneumatic actuator can switch between full forward (1), half forward (0.5), idle (0), half braking (-0.5), and full braking (-1).

In the following description, the system as defined by equation (1) above is sometimes referred to as "system (1)" and is used as an non-limiting example to illustrate the various operations of the method of controlling a transportation vehicle according to the present disclosure.

It is noted that the although system (1) models two actuators (two engine and braking systems), the system is reducible to the situation of one actuator only (i.e., only one engine and braking system). In the case of one actuator, the parameters associated with one of the two actuators in system (1) would be removed or set to zero.

An objective of soft-landing is to drive the vehicle to reach a target set while satisfying a state constraint. The target set represents the destination and may be a window (represented as a range of positions) within which the vehicle is desired to soft-land. The target set may be represented as a set of one or more one or more position-and-velocity states of the vehicle, where each state includes a position of the vehicle (the position being a destination position) and a velocity of the vehicle (the velocity being zero, since the vehicle is stopped at the destination position). In the following discussion, the target set is sometimes denoted by $\tau$ (tau).

For system (1) discussed above, the target set $\tau$ may be defined as $$\tau = \left\{ \begin{bmatrix} x_{m,1} \\ x_{m,2} \end{bmatrix} : \begin{array}{c} x_{min} \leq x_{m,1} \leq x_{max}, \\ x_{m,2} = 0 \end{array} \right\}. \quad (2)$$

Recall that $x_{m,1}(t)$ and $x_{m,2}(t)$ are the position and velocity of the vehicle, respectively. The target set $\tau$ as defined in equation (2) represents that the objective of soft-landing is to stop the vehicle within a small window $[x_{min}, x_{max}]$ around the origin, such as a window of several meters.

The state constraint set, X, enforces that the vehicle approaches the target stopping window (representing the desired destination of the vehicle) neither too fast nor too slow. For system (1) discussed above, X may be defined as $$\mathcal{X} = \left\{ \begin{bmatrix} x_{m,1} \\ x_{m,2} \end{bmatrix} : \begin{array}{c} x_{m,2} + \gamma_{max}(x_{m,1} - x_{max}) \leq 0, \\ x_{m,2} + \gamma_{min}(x_{m,1} - x_{min}) \geq 0. \end{array} \right\}. \quad (3)$$

Figure 3A:
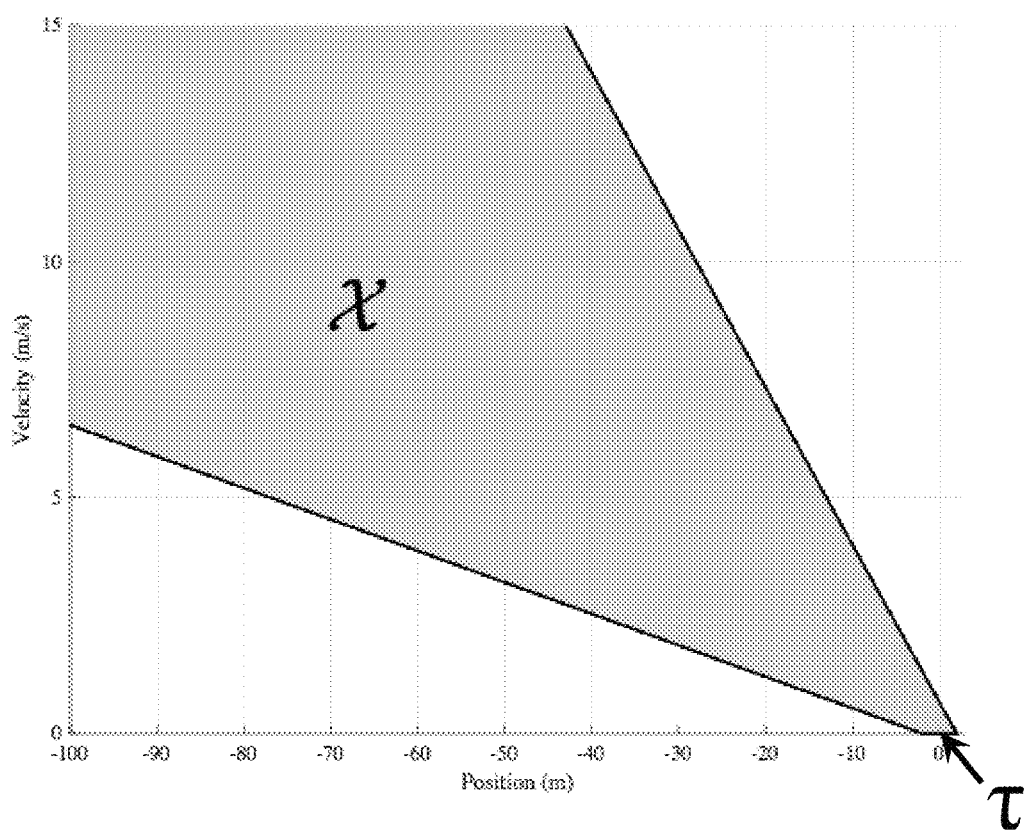
FIG. 3A illustrates an example of a target set.

FIG. 3A illustrates the target set T as defined in equation (2) and the state constraint set X as defined in equation (3). In FIG. 3A, the horizontal axis and vertical axis represent the position and the velocity of the vehicle, respectively. The shaded region represents the state constraint set X, and the line segment around the origin represents the target set $\tau$. As shown in the figure, the origin represents the condition in which the vehicle is at position=0 and at velocity=0, and the target set T include a range of positions $[x_{min}, x_{max}]$ around and close to position=0.

Figure 3B:
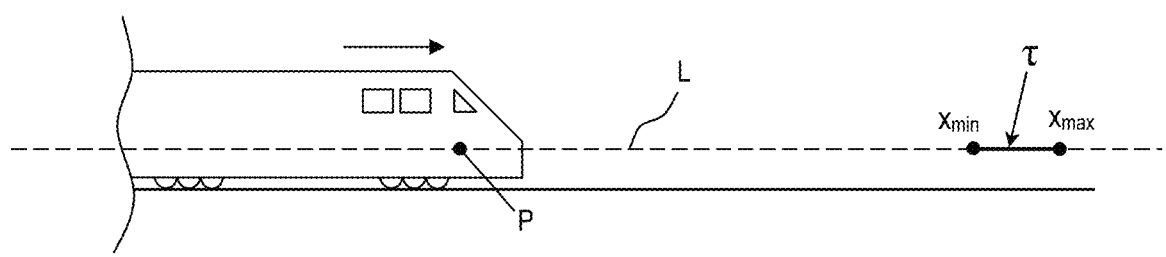
FIG. 3B illustrates a train moving toward the target set.

FIG. 3B illustrates a train moving toward a destination represented by the target set $\tau$. In FIG. 3B, the position of the train is illustrated as the position of an arbitrary point P fixed to the train. The target set $\tau$ is illustrated in the figure as a window (range) of positions, between and including point $x_{min}$ and point $x_{max}$, serving as the destination for the point P. In FIG. 3B, the train is moving along a fixed track; thus, the positions in the system may be represented in a one-dimensional space, represented by line L. While FIG. 3 illustrates the example of a train on a fixed track, the vehicle may be of other types. For example, the vehicle may be road vehicle, such as an automobile. While the movement of a road vehicle is not limited to a fixed track, the stopping of a road vehicle can be modeled in the same manner.

The Soft-Landing Control Design Problem

In general, the soft-landing control design problem pertains to designing a set (denoted by $\mathcal{C}$ in examples below) and a causal control input sequence (denoted by u(t) in the examples below) for controlling the vehicle such that for any initial state of the vehicle within this set, the following two conditions are satisfied: First, the vehicle is controlled such that the velocity and position of the vehicle remain within the constraint set (the condition of constraint satisfaction). Second, the vehicle is controlled such that the velocity and position state of the vehicle eventually reaches a state within the target set (the condition of attractivity).

For the preceding example setup of equations (1), (2) and (3), the soft-landing control design problem can be formulated as follows:

Formulation of the soft-landing control design problem. Given a system (1) and its constraint set X (3) and target set $\tau$ (2), with the assumption that x(t) is available, design a set $\mathcal{C}$ and a causal control input sequence u(t) such that for every $x(0) \in \mathcal{C}$, the following two conditions are satisfied:

$$1. \text{(Constraint Satisfaction)} \begin{bmatrix} x_{m,1}(t) \\ x_{m,2}(t) \end{bmatrix} \in X, \text{ for all } t \geq 0.$$

$$2. \text{(Attractivity)} \lim_{t \to \infty} \begin{bmatrix} x_{m,1}(t) \\ x_{m,2}(t) \end{bmatrix} \in \tau.$$

Terminal Set Construction

One aspect of the present disclosure is the transformation of the standard soft-landing problem of controlling the vehicle to stop within a small window at zero velocity (i.e., controlling the vehicle so as to reach target set $\tau$) into the problem of controlling the vehicle to reach a different small window at velocity that may be a low (but non-zero) velocity. This different small window is called a terminal set, which can thus be understood as an alternate target set.

Referring again to the method depicted in FIG. 1, operation 101 may include determining a terminal set of system states of the vehicle under which the vehicle will converge to the target set (e.g., target set $\tau$) under a constant zero control input state. Each of the system states of the terminal set includes a position-and-velocity state of the vehicle that is within a state constraint set (e.g., state constraint set X), which defines minimum and maximum velocities of the vehicle for reaching the target set from respective positions. The target set, as discussed earlier, is a set of positions of the vehicle that are within a position range of the target destination.

In general, the terminal set, which is denoted $X_\tau$, includes a set of systems states of the vehicle such that each of the system states in the terminal set is a subset of the state constraint set X and is a system state of the vehicle under which the vehicle will eventually arrive at the target set under a constant zero input.

In other words, the terminal set $X_\tau \subset X$ is constructed such that if $x(t) \in X_\tau$ for some t, then x(t) will converge to $\tau$ eventually under a constant zero input. Consequently, the soft-landing control design problem is transformed into designing a control input to reach $X_\tau$.

System (1) can be written in discrete-time form as follows:

$$\begin{bmatrix} x_{m,1}(k+1) \\ x_{m,2}(k+1) \\ x_q(k+1) \end{bmatrix} = A \begin{bmatrix} x_{m,1}(k) \\ x_{m,2}(k) \\ x_q(k) \end{bmatrix} + B \begin{bmatrix} q_e(k) \\ q_a(k) \end{bmatrix}, \quad (4)$$

where $k \in \mathbb{N}$ is the discrete-time index. In the above the short-hand notation, $x(k)=x(t_k)$, where $t_k=k\Delta t$ and $\Delta t$, is the sampling period. Matrices A and B can be computed given the system parameters as stated in (1). Given the specific form of system (1), matrix A in (4) can be written as:

$$A = \begin{bmatrix} 1 & a & b \\ 0 & \lambda_1 & c \\ 0 & 0 & \lambda_2 \end{bmatrix}. \quad (5)$$

Matrices A and B may be calculated based on the dynamics of the train as in equation (1) and a sampling period. These calculations of matrices A and matrix B may involve matrix exponential computations used in control theory.

Next, a terminal set $X_\tau$ can be constructed according to the following Lemma.

Lemma 1. Given system (4), the target set $\tau$ (2), and the state constraint set X (3) with the origin in its interior, if the parameters in matrix A (5) satisfy $0 < \lambda_2 < \lambda_1 < 1$, and a, b, and c are all positive reals, then there exist $\underline{p}, \overline{p}, \overline{v}$, and $\underline{q}$ and a set $X_\tau \in \mathbb{R}^3$ of the form $$X_\tau = \left\{ \begin{bmatrix} x_{m,1} \\ x_{m,2} \\ x_q \end{bmatrix} : \begin{array}{l} -\underline{p} \leq x_{m,1} \leq \overline{p}, \\ 0 \leq x_{m,2} \leq \overline{v}, \\ -\underline{q} \leq x_q \leq 0. \end{array} \right\} \quad (6)$$

such that if $x(k^*) \in X_\tau$ for some $k^* \in \mathbb{N}$, then under constant zero input $[q_e(k)\ q_a(k)]^T \equiv [0\ 0]^T$, $\forall k \geq k^*$, the state trajectory of system (4) satisfies $[x_{m,1}(k)\ x_{m,2}(k)]^T \in X$ for all $k \geq k^*$, and $\lim_{k \to \infty}[x_{m,1}(k)\ x_{m,2}(k)]^T \in \tau$. ∎

The terminal set $X_\tau$ is a subset of the constraint set X (i.e., $X_\tau \subset X$) in that for any $(x_{m,1}, x_{m,2}, x_q)$ within $X_\tau$, the $(x_{m,1}, x_{m,2})$ is also within X. That is, all position-and-velocity states of vehicle in the terminal set are within the constraint set. Additionally, the expression $0 \leq x_{m,2} \leq \overline{v}$ indicates that the terminal set may include velocities that are non-zero.

A proof of the above lemma is provided as follows. Assume that the hypothesis of the lemma holds and $X_\tau$ is of the form (6) where $\underline{p}, \overline{p}, \overline{v}$, and $\underline{q}$ are to be determined. If $x(k^*) \in X_\tau$ for some $k^*$, and $[q_e(k)\ q_a(k)]^T \equiv [0\ 0]^T$, $\forall k \geq k^*$, then by (4) and (5), $$x_q(k) = \lambda_2^{k-k^*} x_q(k^*), \forall k \geq k^*. \quad (7)$$

Consequently, for every $k \geq k^*$, $$x_{m,2}(k) = \lambda_1^{k-k^*} x_{m,2}(k^*) + \sum_{l=k^*}^{k-1} \lambda_1^{k-1-l} c x_q(l) \quad (8)$$

$$= \lambda_1^{k-k^*} x_{m,2}(k^*) + \sum_{l=k^*}^{k-1} \lambda_1^{k-1-l} c \lambda_2^{l-k^*} x_q(k^*)$$

$$= \lambda_1^{k-k^*} x_{m,2}(k^*) + \lambda_1^{k-1-k^*} \sum_{l=k^*}^{k-1} \lambda_1^{k^*-l} c \lambda_2^{l-k^*} x_q(k^*)$$

$$= \lambda_1^{k-k^*} x_{m,2}(k^*) + \lambda_1^{k-1-k^*} c x_q(k^*) \sum_{l=k^*}^{k-1} \left(\frac{\lambda_2}{\lambda_1}\right)^{l-k^*}.$$

Since $\lambda_2/\lambda_1 < 1$ by assumption, $$1 \leq \sum_{l=k^*}^{k-1} \left(\frac{\lambda_2}{\lambda_1}\right)^{l-k^*} < \frac{1}{1-\lambda_2/\lambda_1}.$$

Since $c>0$, $-\underline{q} \leq x_q(k^*) \leq 0$, and $\overline{q}>0$ by assumption, $$-\frac{c\underline{q}}{1-\lambda_2/\lambda_1} < cx_q(k^*)\sum_{l=k^*}^{k-1}\left(\frac{\lambda_2}{\lambda_1}\right)^{l-k^*} \leq 0.$$

Recall (8). Since $0<\lambda_1<1$ and $0 \leq x_{m,2}(k^*) \leq \overline{v}$ by assumption, $$-\frac{c\underline{q}}{1-\lambda_2/\lambda_1} < x_{m,2}(k) \leq \overline{v}, \forall k \geq k^*. \quad (9)$$

Next, by (4) and (5), $$x_{m,1}(k)=x_{m,1}(k^*)+\Sigma_{l=k^*}^{k-1}ax_{m,2}(l)+\Sigma_{l=k^*}^{k-1}bx_q(l),$$
$$\forall k \geq k^*. \quad (10)$$

Recall (8). For all $k \geq k^*+1$, $$\lambda_1^{k-1}\left(-\frac{c\underline{q}}{1-\lambda_2/\lambda_1}\right) < x_{m,2}(k) < \lambda_1^{k-1} \cdot \lambda_1 \overline{v}.$$

Therefore, $$a\frac{1}{1-\lambda_1}\left(-\frac{c\underline{q}}{1-\lambda_2/\lambda_1}\right) < \sum_{l=k^*+1}^{k-1} ax_{m,2}(l) < a\frac{1}{1-\lambda_1}\lambda_1 \overline{v}.$$

Note that since $0 \leq x_{m,2}(k^*) \leq \overline{v}$, $$a\frac{1}{1-\lambda_1}\left(-\frac{c\underline{q}}{1-\lambda_2/\lambda_1}\right) < \sum_{l=k^*}^{k-1} ax_{m,2}(l) < a\frac{1}{1-\lambda_1}\overline{v}.$$

Recalling (7), $$-b\frac{1}{1-\lambda_2}\underline{q} < \sum_{l=k^*}^{k-1} bx_q(l) \leq 0.$$

Recalling (10) and noting that $x(k^*) \in X_\tau$, $$-\underline{p}-a\frac{1}{1-\lambda_1}\left(\frac{c\underline{q}}{1-\lambda_2/\lambda_1}\right)-b\frac{1}{1-\lambda_2}\underline{q} < x_{m,1}(k) < \overline{p}+a\frac{1}{1-\lambda_1}\overline{v}, \quad (11)$$
$$\forall k \geq k^*.$$

Since the origin is in the interior of X, there is some $\delta>0$ such that $\{x \in \mathbb{R}^2:\|x\|_1<\delta\} \subset X$. Recall (9) and (11). $\underline{p}$, $\overline{p}$, $\overline{v}$, and $\underline{q}$ are chosen sufficiently small such that $$\left|-\frac{c\underline{q}}{1-\lambda_2/\lambda_1}\right| < \delta/2, |\overline{v}| < \delta/2,$$

$$\left|-\underline{p}-a\frac{1}{1-\lambda_1}\left(\frac{c\underline{q}}{1-\lambda_2/\lambda_1}\right)-b\frac{1}{1-\lambda_2}\underline{q}\right| < \delta/2, \text{ and } \left|\overline{p}+a\frac{1}{1-\lambda_1}\overline{v}\right| < \delta/2;$$

then, $[x_{m,1}(k)\ x_{m,2}(k)]^T \in X$ for all $k \geq k^*$. It is noted that that when selecting the terminal set, the choice of values for the parameters $\underline{p}$, $\overline{p}$, $\overline{v}$, $\underline{q}$ is not unique. The values of $\underline{p}$, $\overline{p}$, $\overline{v}$, $\underline{q}$ can be arbitrarily selected so long as the choices satisfy the requirements specified in this paragraph.

Recall (8) and note that both $\|x_{m,2}(k^*)\|$ and $$\left\|cx_q(k^*)\sum_{l=k^*}^{k-1}\left(\frac{\lambda_2}{\lambda_1}\right)^{l-k^*}\right\|$$

are bounded and that $\lambda_1$ is less than 1. Thus, $x_{m,2}(k)$ is convergent and $\lim_{k\to\infty}x_{m,2}(k)=0$. Recall (10) and note that $\lim_{l\to\infty}(x_{m,2}(l))^{1/l}=<1$ and that $x_q(l)=\lambda_2^{l-k^*}x_q(k^*)$. Thus, $x_{m,1}(k)$ is convergent. Recalling (11), choose $\underline{p}$, $\overline{p}$, $\overline{v}$, and $\underline{q}$ such that $$-\underline{p}-a\frac{1}{1-\lambda_1}\left(\frac{c\underline{q}}{1-\lambda_2/\lambda_1}\right)-b\frac{1}{1-\lambda_2}\underline{q} > x_{min}, \quad (12)$$

$$\overline{p}+a\frac{1}{1-\lambda_1}\overline{v} < x_{max},$$

then $x_{min} < \lim_{k\to\infty}X_{m,1}(k) < x_{max}$.

One example systematic way of choosing the parameters $\underline{p}$, $\overline{p}$, $\overline{v}$, $\underline{q}$ is as follows: First, determine a $\delta>0$ such that $\{x \in \mathbb{R}^2:\|x\|_1<\delta\} \subset X$. Next, choose $\overline{v}$ and $\underline{q}$ such that $$\left|-\frac{c\underline{q}}{1-\frac{\lambda_2}{\lambda_1}}\right| = \delta/3,$$

and $|\overline{v}|=\delta/3$. Next, choose $\overline{p}$ such that $$\left|\overline{p}+a\frac{1}{1-\lambda_1}\overline{v}\right| = \delta/3,$$

by halving or otherwise reducing the value of $\overline{v}$ multiple times if necessary. Similarly, choose $\underline{p}$ such that $$\left|-\underline{p}-a\frac{1}{1-\lambda_1}\left(\frac{c\underline{q}}{1-\frac{\lambda_2}{\lambda_1}}\right)-b\frac{1}{1-\lambda_2}\underline{q}\right| = \delta/3,$$

by halving or otherwise reducing the value of $\underline{q}$ multiple times if necessary. Finally, test this choice of parameters $\underline{p}$, $\overline{p}$, $\overline{v}$, and $\underline{q}$ in equation (12). If (12) is satisfied, then this choice is final; if not, halve or otherwise reduce $\underline{p}$, $\overline{p}$, $\overline{v}$, and $\underline{q}$ simultaneously and test (12) again. Keep halving or otherwise reducing the parameters $\underline{p}$, $\overline{p}$, $\overline{v}$, and $\underline{q}$ until (12) is satisfied, to thereby reach the final choice of the parameters $\underline{p}$, $\overline{p}$, $\overline{v}$, and $\underline{q}$. The value of a parameter can be reduced by, for example, multiplication with a number less than 1. Multiplication with 0.5 would result in the value being halved.

Consequently, $\lim_{k\to\infty}[x_{m,1}(k)\ x_{m,2}(k)]^T \in \tau$. ∎

Backward Reachability Computation with Linear Complexity

By Lemma 1, the soft-landing control design problem is transformed into finding a control input sequence that can drive the system state to reach the terminal set $X_r$ (6). A possible approach is to compute a sequence of backward reachable sets of $X_r$.

For a given a time horizon $N \in \mathbb{Z}_+$, the sequence of backward reachable sets may be defined as $\{\mathcal{R}^{(k)}\}_{k=0}^N$, where k represents the index in the sequence. The first backward reachable set, $\mathcal{R}^{(0)}$, is the terminal set $X_r$. Then, each next backward reachable set in the sequence is the set of all x belonging to the state constraint set X from which the previous backward reachable set is reachable using some input u that is within the control input set $\mathcal{U}$. The sequence $\{\mathcal{R}^{(k)}\}_{k=0}^N$ may be defined as $$\mathcal{R}^{(0)} = X_v, \quad (13)$$

$$\mathcal{R}^{(k+1)} = \{x \in X : Ax + Bu \in \mathcal{R}^{(k)}, \text{ for some } u \in \mathcal{U}\}, \quad (14)$$

for k=0, . . . , N−1. An immediate issue with the above approach is that the required computation grows exponentially with N: Computing $\mathcal{R}^N$ could potentially require $|\mathcal{U}|^N$ elementary polytopic operations. In this particular example of system (1) where $|\mathcal{U}|=15$, if N=20, then the required number of operations could reach the order of $10^{23}$, which is computationally undesirable.

To avoid exponential computational complexity, this disclosure provides a process to approximately compute the backward reachable sets such that the required number of operations grows linearly with N.

Referring again to the method depicted in FIG. 1, operation 102 may include: determining a sequence of polytopes, each of the polytopes representing a respective plurality of system states of the vehicle that are backward reachable from a respective target-state set (e.g.,) $\mathcal{R}^{(0)}$ in Algorithm 1 below), which is the terminal set (e.g., terminal set $X_r$) for a first polytope in the sequence and is a previous-in-sequence polytope for each subsequent polytope in the sequence.

The sequence of polytopes may be determined using a process of computing approximate backward reachable sets. Each respective polytope in the sequence of polytopes may be determined by a polytope-determining process that includes: determining a backward reachable set from which the respective target-state set is reachable by one or more inputs within the control input set, and approximating the backward reachable set with an approximate polytope that is a subset of the backward reachable set, the approximate polytope being determined as the respective polytope in the sequence of polytopes. The determined sequence of polytopes includes a polytope that represents a current system state of the vehicle.

A proposed technique for computing approximate backward reachable sets is as follows. First, compute the backward reachable sets of for only a few steps. The computed reachable set, say $\mathcal{R}^{(2)}$ or $\mathcal{R}^{(3)}$, is a union of polytopes. next, use a single large polytope (also referred to as an approximate polytope) to approximate this union of polytopes. Iteratively, compute the backward reachable sets of this approximate polytope for a few steps, and use another large polytope to approximate the computed union of polytopes. This process is repeated until the time horizon N is reached. This process may be implemented in accordance with Algorithm 1 shown below. In the algorithm, "S" indicates the number of steps. Typically, "S" is a small integer, for instance 2 or 3.

---

Algorithm 1: Algorithm for computing approximate backward reachable sets to determine a sequence of polytopes 1: Initialize: $\mathcal{R}^{(0)} = \chi_v$, k = 1.
2: while kS ≤ N do
3:    Compute backward reachable sets $\mathcal{R}^{(1)}, \ldots, \mathcal{R}^{(S)}$ as in (14)
4:    Approximate $\mathcal{R}^{(S)}$ with a polytope $\mathcal{P}^{(k)}$ satisfying $\mathcal{P}^{(k)} \subset \mathcal{R}^{(S)}$.
5:    Update $\mathcal{R}^{(0)} \leftarrow \mathcal{P}^{(k)}$.
6:    k ← k + 1.
7: end while
8: Return: Polytopes $\mathcal{P}^{(1)}, \mathcal{P}^{(2)}, \ldots, \mathcal{P}^{(N/S)}$

---

In Algorithm 1, the amount of required computation grows linearly with the time horizon N.

Note that Line 3 of Algorithm 1 shows an operation of determining a first backward reachable set $\mathcal{R}^{(1)}$ from which the respective target-state set (i.e., $\mathcal{R}^{(0)}$, which is $X_r$ in the first iteration of the "while loop") is reachable by one or more inputs within the control input set $\mathcal{U}$, and then determining a second backward reachable set $\mathcal{R}^{(S)}$ from which the first backward reachable set is reachable by a certain number of inputs within the control input set $\mathcal{U}$ of the vehicle. The number of inputs is equal to or less than the number of steps, S.

S, the number of steps, may be of an arbitrary number, such as 1, 2, 3, 4, 5, 6, etc. For example, if the number of steps is 2, then line 2 of Algorithm 1 would be "while 2k≤N do" and line 4 of Algorithm 1 would be "Approximate $\mathcal{R}^{(2)}$ with a polytope $\mathcal{P}^{(k)}$ satisfying $\mathcal{P}^{(k)} \subset \mathcal{R}^{(2)}$." For example, if the number of steps is 3, then line 2 of Algorithm 1 would be "while 3k≤N do" and line 4 of Algorithm 1 would be "Approximate $\mathcal{R}^{(3)}$ with a polytope $\mathcal{P}^{(k)}$ satisfying $\mathcal{P}^{(k)} \subset \mathcal{R}^{(3)}$." Increasing the number of steps results in higher accuracy but greater complexity for each iteration.

For purposes of discussing additional computations that utilize the polytopes calculated according to Algorithm 1, it is sometimes assumed for convenience that S=2, in which case the sequence of polytopes returned by Algorithm 1 is $\mathcal{P}^{(1)}, \mathcal{P}^{(2)}, \ldots, \mathcal{P}^{(N/2)}$.

Line 4 of Algorithm 1 refers to the process of approximating the backward reachable set with an approximate polytope. This process, which finds a large polytope to approximate a union of polytopes, may include: determining a convex hull of polytopes in the union of polytopes; determining a reduced-size polytope by shrinking the convex hull into the reduced-size polytope; determining respective intersections of the polytopes in the union of polytopes with the reduced-size polytope; determining whether a union of the intersections is convex; and upon determining that the union of the intersections is convex, determining the union of intersections as the approximate polytope.

To illustrate, consider the following problem: Given a union of polytopes $U_{i=1}^{N_Q}Q_i$, find a polytope R such that $R \subset U_{i=1}^{N_Q}Q_i$. To solve this problem, this disclosure propose the following algorithm, which is based on polytope covering.

---

Algorithm 2: Algorithm for approximating a union of polytopes with one polytope

1:    Input: $U_{i=1}^{N_Q} Q_i$
2:    Compute V = hull($Q_1, \ldots, Q_{N_Q}$)
3:    loop
4:       Shrink V to a smaller polytope V'
5:       Compute $V_i' = V' \cap Q_i$, $1 \le i \le N_Q$
6:       if $U_{i=1}^{N_Q} V_i'$ is convex then Algorithm 2: Algorithm for approximating a union of
polytopes with one polytope

```
7:        Exit loop
8:      end if
9:        Update V ← V'
10:   end loop
11:   Return: R = ∪_{i=1}^{NQ} V_i.
```

Note that the R that is returned by Algorithm 2 at line 11 is a subset of $\cup_{i=1}^{NQ} Q_i$.

In line 2 of Algorithm 2, "hull" refers to a function that computes the convex hull of the input points. To illustrate "hull", consider a polytope Q, let $q_2, q_N$ be its vertices. Then, $Q=\text{hull}(q_1, q_2, \ldots, q_N)$. Next, let $Q_1, Q_2, \ldots, Q_{NQ}$ be NQ polytopes, and let $Q_i$ have vertices $q_{1,i}, q_{2,i}, \ldots, q_{Ni,i}$, where $1 \le i \le NQ$. Then, $V = \text{hull}(Q_1, \ldots, Q_{NQ}) = \text{hull}(q_{1,1}, q_{2,1}, \ldots, q_{N1,1}, q_{1,2}, q_{2,2}, \ldots, q_{N2,2}, \ldots, q_{1,NQ}, q_{2,NQ}, \ldots, q_{NNQ,NQ})$. That is, the output V returned by "hull" is the convex hull of all of vertices of all of the polytopes $Q_1$ through $Q_{NQ}$.

Figure 4A:
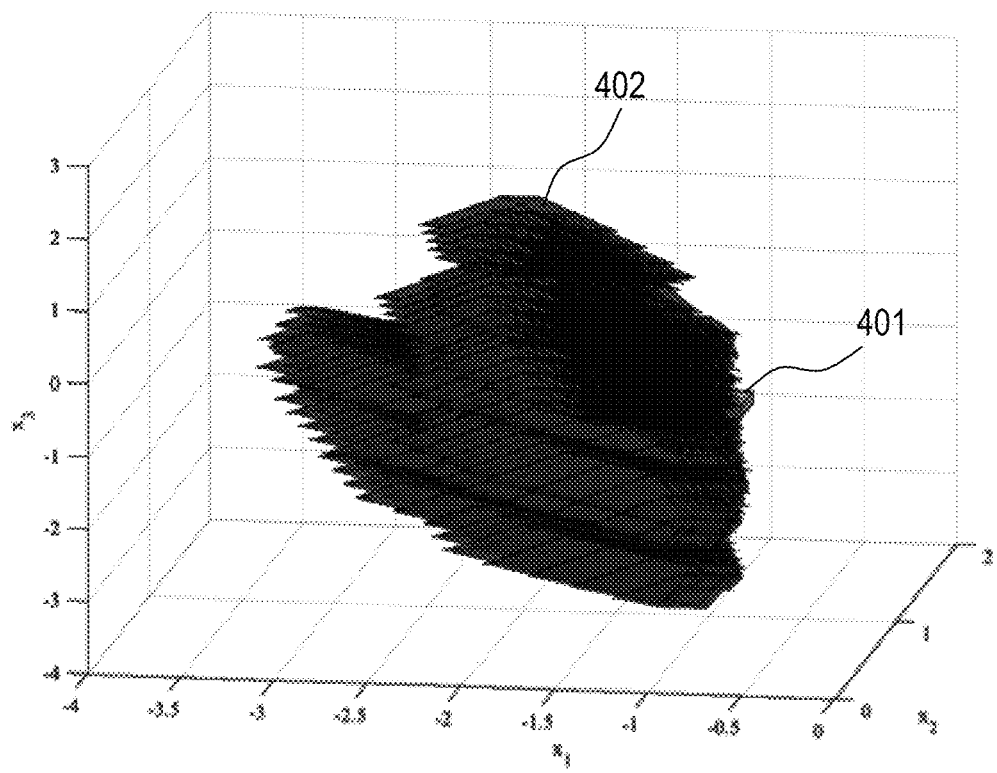
FIG. 4A is a plot showing an example terminal set and an example backward reachable set $\mathcal{R}^{(3)}$ of the terminal set, for an example implementation of Algorithms 1 and 2.

FIGS. 4A-6B illustrate an implementation of Algorithm 1 and Algorithm 2 for a specific instance of system (1) and the corresponding system parameters discussed above. FIGS. 4A-4B show a backward reachable set of $X_\tau$ for 3 steps and its approximation. FIG. 4A shows a terminal set $X_\tau$ (401) and $\mathcal{R}^{(3)}$ (402). FIG. 4B shows $\mathcal{P}^{(1)}$ computed as an approximation of $\mathcal{R}^{(3)}$.

Figure 4B:
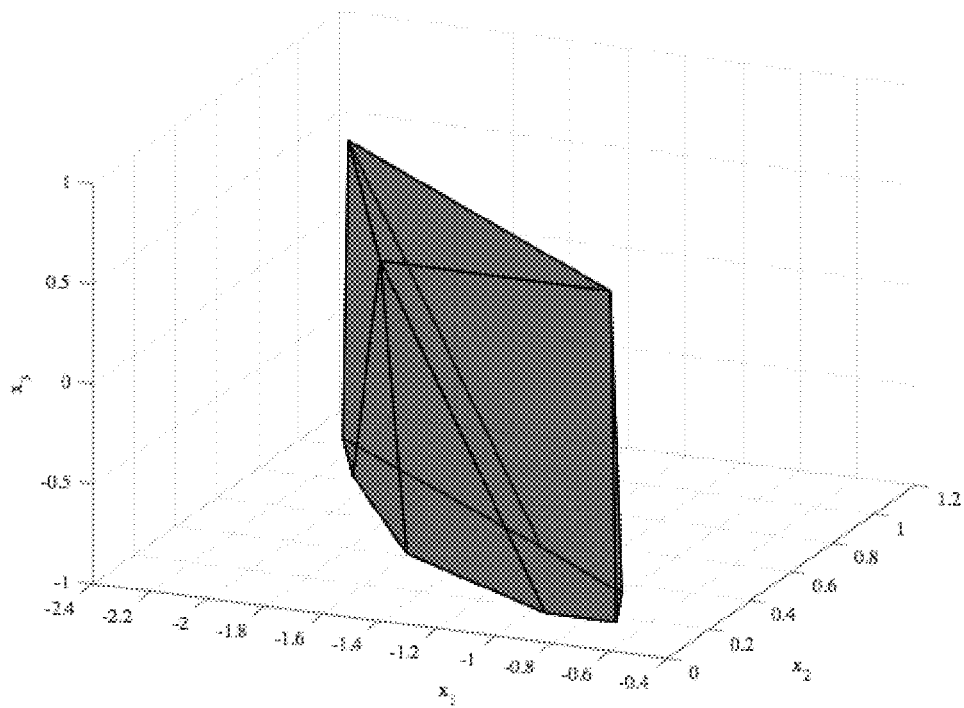
FIG. 4B is a plot of a polytope $\mathcal{P}^{(1)}$ used to approximate the backward reachable set $\mathcal{R}^{(3)}$ shown in FIG. 4A.

As shown in FIG. 4A, a terminal set $X_\tau$ (6) was constructed according to Lemma 1 and its derivation. Then the backward reachable set $\mathcal{R}^{(3)}$ of was computed for three steps according to (13) and (14). Since $\mathcal{R}^{(3)}$ is a union of polytopes and this union is connected, a single polytope $\mathcal{P}^{(1)}$ was used to approximate it, as shown in FIG. 4B. Here, $\mathcal{P}^{(1)}$ was generated by inspecting $\mathcal{R}^{(3)}$. While inspection is one way of generating the approximate polytope, the process is implemented on a controller, the controller would follow an algorithm, such as Algorithm 2.

Figure 5A:
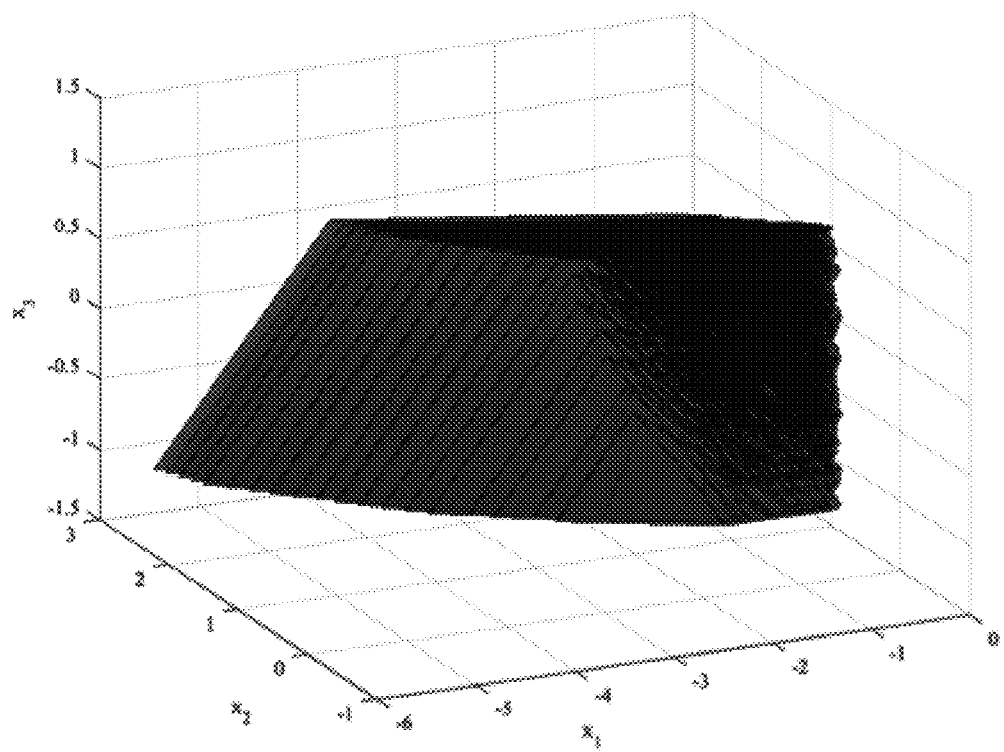
FIG. 5A is a plot of a backward reachable set $\mathcal{R}^{(2)}$ of the polytope $\mathcal{P}^{(1)}$ shown in FIG. 5B.
Figure 5B:
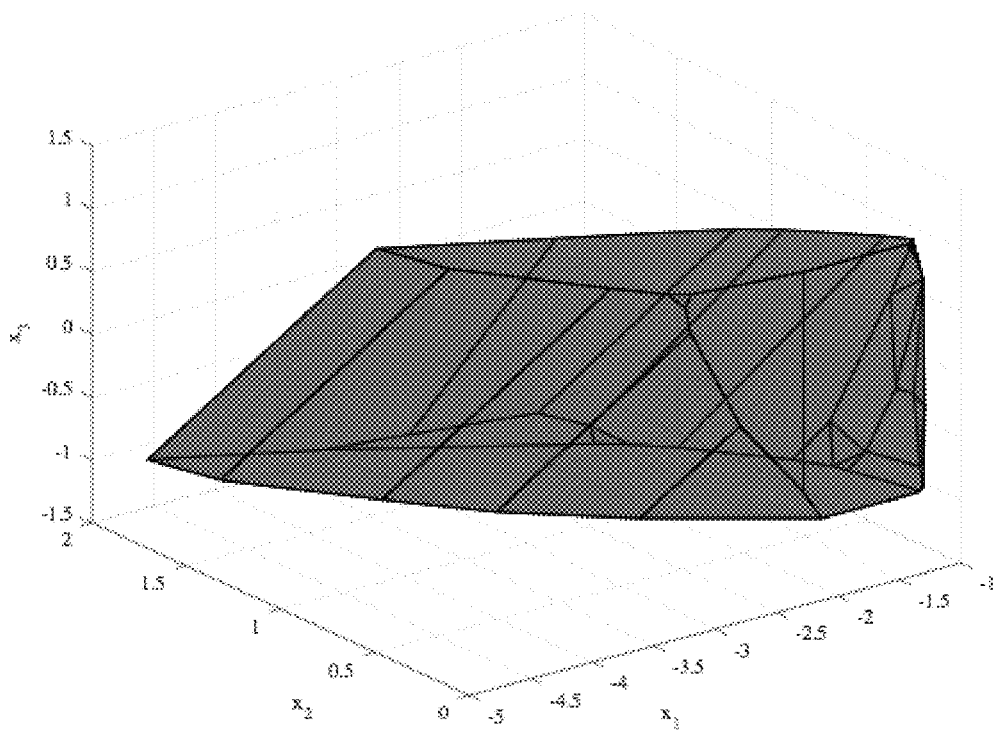
FIG. 5B is a plot of a polytope $\mathcal{P}^{(2)}$ generated as an approximation of the backward reachable set $\mathcal{R}^{(2)}$ shown in FIG. 5A.

FIGS. 5A-5B show a backward reachable set of $\mathcal{P}^{(1)}$ for 2 steps and its approximation. Given $\mathcal{P}^{(1)}$, its backward reachable sets for two steps was computed as stated in line 3 in Algorithm 1. As shown in FIG. 5A, the computed reachable set $\mathcal{R}^{(2)}$ of $\mathcal{P}^{(1)}$ is a union of polytopes, and Algorithm 2 was run to generate a polytope $\mathcal{P}^{(2)}$ (shown in FIG. 5B) as an approximation of $\mathcal{R}^{(2)}$.

Figure 6A:
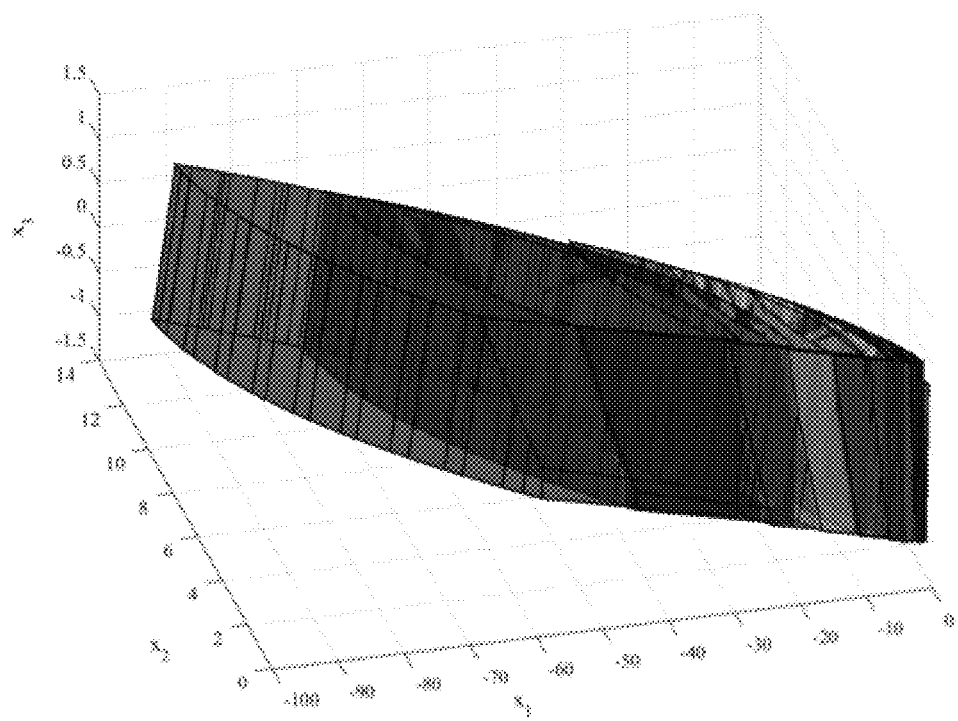
FIG. 6A is a plot showing a computed sequence of polytopes, which includes the polytopes $\mathcal{P}^{(1)}$ and $\mathcal{P}^{(2)}$ shown in FIGS. 4B and 5B.
Figure 6B:
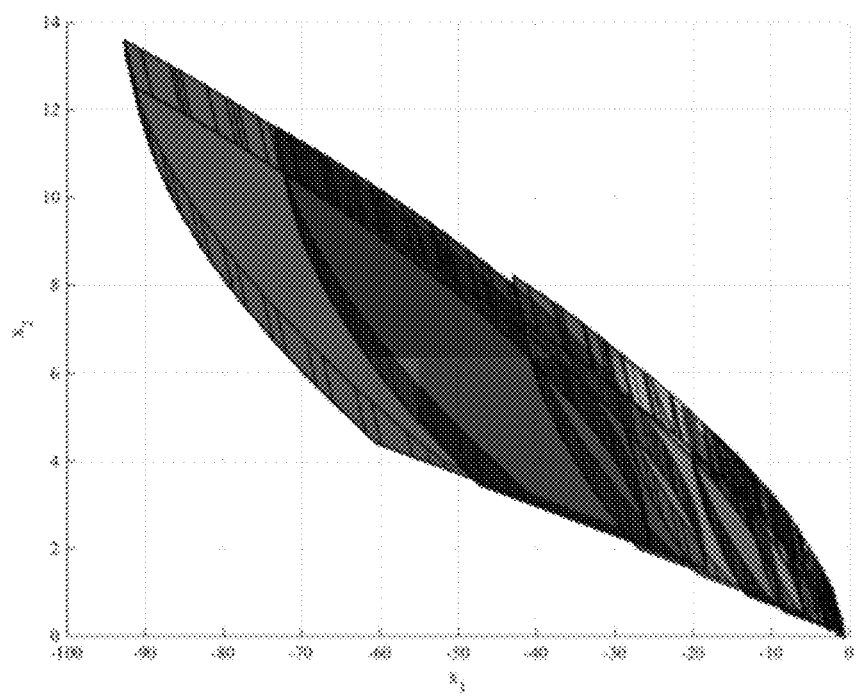
FIG. 6B shows a projection of the sequence of polytopes on a location-velocity plane.

Repeating the preceding computation according to the "while" loop in Algorithm 1, a sequence of polytopes $\mathcal{P}^{(1)}, \mathcal{P}^{(2)}, \ldots, \mathcal{P}^{(10)}$ was generated such that $\cup_j^{10} \mathcal{P}^{(i)}$ is an approximation of the backward reachable set $\mathcal{R}^{(N)}$ starting from the terminal set $X_\tau$ with N=21. The computed polytopes are shown in FIGS. 6A-6B. FIG. 6A shows $\mathcal{P}^{(1)}, \ldots, \mathcal{P}^{(10)}$. FIG. 6B shows the projection on a location-velocity plane.

In this illustration, when computing the backward reachable sets, only the situation where $x_q(t)$ is bounded was considered because $\lambda_2 < 1$ in (4), (5), and the input set is bounded. Therefore, $x_q(t)$ would be bounded.

Computation and Implementation of Control Input

Referring to FIG. 1, the method of controlling a vehicle to soft-land at a target destination may include controlling the vehicle to reach the destination based on the determined polytopes (operation 103). This operation may include: controlling the vehicle to drive the vehicle from the current system state, through a trajectory of system states of the vehicle, and to a state in the terminal set (e.g., terminal set $X_\tau$), the trajectory passing through system states of the vehicle respectively represented by polytopes of a reverse sequence of the sequence of polytopes (e.g., a reverse sequence of the sequence of polytopes $\mathcal{P}^{(1)}, \mathcal{P}^{(2)}, \ldots, \mathcal{P}^{(10)}$, discussed above); and upon determining that the vehicle has reached the terminal set, controlling the vehicle to a constant zero control input state such that the vehicle arrives at the target set.

The operation of controlling the vehicle to soft-land may include generating a quantized control input commands to approximately minimize a cost function and, at the same time, driving the vehicle (e.g., train) such that the vehicle stays within the constraint set X and eventually stops within the target set τ. As will be more apparent from the following discussion, a feature of the computation is that the computation complexity is linear with respect to the control input sequence length, while a brute force solution to this integer optimization problem would require exponential complexity.

Assuming the hypothesis in Lemma 1 is satisfied, it is possible to construct the terminal set $X_\tau$ and compute the backward reachable sets $$\bigcup_{i=1}^{\frac{N}{2}} \mathcal{P}^{(i)}$$

as discussed above. This construction of terminal set and backward reachable set establishes the feasibility of a solution to the aforementioned formulation of the soft-landing control design problem, as explained below.

Particularly, by Algorithm 1, for every $x \in \mathcal{P}^{(i+1)}$ there exists $(u_1, u_2) \in \mathcal{U}^2$ such that $$Ax + Bu_1 \in X,$$

$$A^2 x + Bu_2 + ABu_1 \in \mathcal{P}^{(i)}. \tag{15}$$

Next, define set $\mathcal{C}$ as $$\mathcal{C} = \bigcup_{i=1}^{\frac{N}{2}} \mathcal{P}^{(i)}. \tag{16}$$

Lemma 2. Given system (4), the constraint set X (3), and the target set τ (2), assume the hypothesis in Lemma 1 are satisfied. Let $\mathcal{P}^{(1)}, \ldots, \mathcal{P}^{(N/2)}$ be computed using Algorithm 1, and let $\mathcal{C}$ be defined as in (16). For all $x(0) \in \mathcal{C}$, there exists a control input sequence $\{u_k\}_{k=0}^{N-1} \in \mathcal{U}^N$ such that items 1) and 2) in the formulation of the soft-landing control design problem are satisfied. ∎

Essentially, Lemma 2 states that for all initial states $x(0) \in \mathcal{C}$, the existence of a control input sequence that solves the formulation of the soft-landing control design problem is mathematically guaranteed.

With the existence of the solution established, an optimal control approach is formulated below. Principles in dynamic programming may be used to actually find the control input sequence. Dynamic programming is especially useful in this case because of the discrete nature of the input set (see A. E. Bryson, Applied optimal control: optimization, estimation and control. CRC Press, 1975, p. 136). In particular, consider the following optimal control problem:

For $x(0) \in \mathcal{C}$ (16), determine $t_f \in \mathbb{N}$ and $\{u(t)\}_{t=0}^{t_f-1} \in \mathcal{U}^{t_f}$ such that the cost J is minimized, where J is defined as $$J = \Sigma_{t=0}^{t_f-1}(x(t)^T Q x(t) + u(t)^T R u(t) + L), \quad (17)$$

subject to $$x(t+1) = Ax(t) + Bu(t), t = 0, 1, \ldots, t_f,$$

$$x(t) \in X, t = 0, 1, \ldots, t_f,$$

$$x(t_f) \in X_\tau. \quad (18)$$

In (17), positive symmetric definite matrices Q, R correspond to state cost and input cost respectively, and L>0 corresponds to the time cost.

The optimal control problem as formulated above can be sub-optimally solved as follows. Start by defining a cost-to-go function V(x). Specifically, for $x \in \mathcal{C}$, define a function V(x) recursively as:

$$V(x) = 0, \forall Vx \in X_\tau, \quad (19)$$

and for k≥1, let f(x,u) denote Ax+Bu. Recall in Algorithm 1 where "S" is the number of steps, for any 1≤M≤S, write $u = (u_1, u_2, \ldots, u_M) \in \mathcal{U}^M$, and define V(x) on the set $\mathcal{P}^{(k)} \setminus ((\cup_{i=1}^{k-1} \mathcal{P}^{(i)}) \cup X_\tau)$ as the following equation (20):

$$V(x) = \min_{u \in \bigcup_{M=1}^{S} \mathcal{U}^M} \begin{cases} x^T Q x + u_1^T R u_1 + L + V(f(x, u_1)). & \text{if } u \in \mathcal{U}^1 \text{ and } f(x, u_1) \in \left(\bigcup_{i=1}^{k-1} \mathcal{P}^{(i)}\right) \cup X_\tau, \\ x^T Q x + \sum_{j=1}^{M-1} f(\ldots f(f(x, u_1), u_2) \ldots u_j)^T & \text{if } u \in \mathcal{U}^M \text{ for some } 2 \le M \le S, \\ Q f(\ldots f(f(x, u_1), u_2) \ldots u_j) + & f(x, u_1), f(f(x, u_1), u_2), f(\ldots (f(x, u_1), u_2) \ldots \\ \sum_{j=1}^{M-1} u_j^T R u_j + ML + V(f(\ldots f & u_{M-1}) \in X \setminus \left(\left(\bigcup_{i=1}^{k-1} \mathcal{P}^{(i)}\right) \cup X_\tau\right), \text{ and} \\ (f(x, u_1), u_2) \ldots u_M)), & f(\ldots f(f(x, u_1), u_2) \ldots u_M) \in \left(\bigcup_{i=1}^{k-1} \mathcal{P}^{(i)}\right) \cup X_\tau. \end{cases} \quad (20)$$

For example, in the case of S=2, the right-hand side of equation (20) becomes:

$$\min_{(u_1, u_2) \in \mathcal{U}^2} \begin{cases} x^T Q x + u_1^T R u_1 + L + V(f(x, u_1)), & \text{if } f(x, u_1) \in \left(\bigcup_{i=1}^{k-1} \mathcal{P}^{(i)}\right) \cup X_\tau, \\ x^T Q x + f(x, u_1)^T Q f(x, u_1) + u_1^T R u_1 & \text{if } f(x, u_1) \in X \setminus \left(\left(\bigcup_{i=1}^{k-1} \mathcal{P}^{(i)}\right) \cup X_\tau\right), \\ + u_2^T R u_2 + 2L + V(f(f(x, u_1), u_2)), & \text{and } f(f(x, u_1), u_2) \in \left(\bigcup_{i=1}^{k-1} \mathcal{P}^{(i)}\right) \cup X_\tau. \end{cases} \quad (12)$$

By (15), V(x) is well-defined for all $x \in \mathcal{C}$. The formulation in (20) is based on the principle of the Bellman equation.

The value function V(x) may be computed a priori on a discretized state space (rather than a continuous state space) by generating a grid $\{x_i^D\}_{i=1}^{N_x} \subset \mathcal{C}$ and computing $V(x_i^D)$, i=1, . . . , $N_x$ accordingly. That is, the state space in each of the polytopes in the sequence of polytopes may be discretized into state-space points in the state space, and the domain x of V(x) may be the combination of all discretized points across all of the polytopes in the sequence of polytopes. The number of discretized points may be the same among each of the polytopes, but may also be different.

With the cost-to-go function V(x) computed, the controller 210 and 210a of FIGS. 2A-2B may control the vehicle to perform soft landing by: (a) determining that a current system state of the vehicle is within a certain polytope in the sequence of polytopes; (b) determining a control input sequence predicted to be capable of driving the vehicle from a system state representing the current state to a system state in a next polytope; and (c) controlling the vehicle by applying the control input sequence, so as to drive the vehicle from the current system state to a new system state of the vehicle. The determining may utilize outputs of the one or more sensors 230 that indicate a current position and velocity of the vehicle or otherwise permit the controller 210 to determine the current position and velocity of the vehicle. The system state representing the current state may either be equal to the current state or represent the current state by approximation. In the case of discretized state space, the state-space points in the certain polytope might not exactly match the actual current state of the vehicle. Therefore, in the case of discretize state space, the aforementioned operation (a) would include determining a particular state-space point that is, among the plurality of state-space points in the certain polytope, the closest one to the actual current system state of the vehicle. This particular state-space point thus represents the actual current state of the vehicle by approximation.

To determine the control input sequence, the controller may select the control input sequence corresponding to the minimum cost-to-go function for the state-space point that is or represents the current state of the vehicle. By the computation of the cost-to-go function V(x), this control input sequence was predicted as being capable of driving the vehicle from a system state representing the current state to a system state in the next polytope. This "system state in the next polytope" is a system state that is within the respective target-state set associated with the aforementioned polytope. For example, for polytopes $\mathcal{P}^{(N/2)}$ to $\mathcal{P}^{(2)}$, the respective target-state set is the polytope that is earlier-in-sequence (i.e., having a lower index) than the aforementioned polytope; for polytope $\mathcal{P}^{(1)}$, the respective target-state set is the terminal set $X_\tau$. The length of the control input sequence is equal to or less than the number of steps, S (which is 2 in the instant discussion of polytopes $\mathcal{P}^{(N/2)}$ to $\mathcal{P}^{(2)}$), in the computation of backward reachable sets.

To drive the vehicle to the aforementioned "new system state of the vehicle," the controller may select the control input sequence corresponding to the minimum cost-to-go function for the state-space point that is or represents the current state of the vehicle, and apply, to the one or more engine and brake systems 220, the determined control input sequence. If the vehicle's movement is perfectly modeled by the computations, the new system state of the vehicle would simply be equal to the next system state mentioned above. However, the new system state may be somewhat different from the next system state as a result of discretization or other perturbations.

The above operations (a), (b), and (c) may be repeated until the vehicle reaches a position-and-velocity state included in the terminal set (e.g., the terminal set $X_t$).

When the controller 220 determines that the vehicle has reached the terminal set (by, for example, determining that the current state of the vehicle is within the terminal set), the controller 220 applies a zero control input state to the one or more engine and brake systems 220, such that the vehicle arrives at the target set.

The following Algorithm 3 provides an example implementation of the operations of the controller in solving the soft landing problem:

---

Algorithm 3: Algorithm for a controller for soft-landing

1:     Input: $x(0) \in \mathcal{C}$
2:     Initialize $x \leftarrow x(0)$.
3:     while $x \notin X_\tau$ do
4:        Determine $k = \min\{k' \in \mathbb{N} : x \in \mathcal{P}^{(k')}\}$
5:        Compute $u^* = \mathrm{argmin}_{u \in \cup_{M-1}^{S} u^* V(x)}$
6:        Apply $u^*$ to system (4) to reach the state $x'$
7:        Update $x \leftarrow x'$
8:     end while
9:     Apply constant zero control input to system (4).

---

For the purpose of the following exposition, the number of steps "S" is taken to be 2. A controller configured to perform Algorithm 3 has the following property: Given system (4), the constraint set X (3), and the target set τ (2), assume the hypothesis in Lemma 1 are satisfied and the terminal set $X_\tau$ is constructed accordingly. Let the design parameters N, Q, R, L be given, and let $\mathcal{P}^{(1)}, \ldots, \mathcal{P}^{(N/2)}$ be computed using Algorithm 1, and the value function V(x) be computed recursively based on (19), (20). Let $$\mathcal{C} = \bigcup_{i=1}^{\frac{N}{2}} \mathcal{P}^{(i)},$$

then for all $x(0) \in \mathcal{C}$ the control input sequence generated by Algorithm 3 solves the aforementioned formulation of the soft-landing control design problem and sub-optimally minimizes the cost function J (17). ∎

As noted above, the value function V(x) may be computed a priori on a discretized state space (instead of a continuous state space) by generating a grid $\{x_i^D\}_{i=1}^{N_x} \subset \mathcal{C}$ and computing $V(x_i^D)$, $i=1, \ldots, N_x$ accordingly. Then in the implementation of the controller, whenever the controller needs to evaluate V(x) (as in line 5 of Algorithm 3), it uses the approximate value $V(x) \approx V(x_{i^*}^D)$ where $i^* = \mathrm{argmin}_i \|x - x_i^D\|$.

By the method according to the present disclosure, a process of controlling a vehicle to soft-land can be carried out with linear computational complexity for computations involved in the process. Accordingly, the controller (controller 210 of FIG. 2A) performing the method may do so in a computationally efficient matter. Additionally, the method enables optimality of the quantized control input as a result of the optimization process represented in line 5 of Algorithm 3.

Among the operations discussed in this disclosure, operation 101 of FIG. 1 (e.g., Algorithm 1), operation 102 of FIG. 1 (e.g., algorithm 2), and the determination of V(x)) may be carried out by the controller in advance of applying a control input to the vehicle. As such, the online computation burden for an on-board controller that implements Algorithm 3 may be relatively small.

As noted, the controller 210 of FIG. 2 may be configured, by any combination of hardware and software, to perform or cause the system 200 to perform any of the operations shown in FIG. 1, and, in general, any controller-implementable process, operation and functionality discussed in this disclosure. Controller 210 of FIG. 2A may, according to certain embodiments, be an on-board controller installed in the vehicle, in which case the vehicle may the entire process shown in FIG. 1 and the associated computations discussed in this disclosure.

The functionalities of controller 210 FIG. 2A may also be separated between on-board and off-board controllers. Referring to FIG. 2B, the off-board controller 210b may perform operation 101 of FIG. 1 (e.g., Algorithm 1), operation 102 of FIG. 1 (e.g., algorithm 2), and the determination of the cost-to-go function V(x)), and would then transmit any information computed by these operations to the vehicle 301. In particular, the external controller 210b may transmit the cost-to-go function V(x), by a transmitter or transceiver of the external system 302, to the vehicle 301 for use by the on-board controller 210a. In response to receiving the cost-to-go function V(x) through a receiver or transceiver of the vehicle, the controller 210a may store the cost-to-go function V(x) in the memory 212a, and proceed use the stored cost-to-go function V(x) to control the vehicle.

The at least one hardware processor 211 of the controller 210 may be configured (e.g., programmed) to implement functionalities of the controller 210, including the computation of the terminal set $X_\tau$, the sequence of polytopes, and the value function V(x), the selection of the input $(u_1^*, u_2^*)$ in Algorithm 3, and any other operations (arithmetic, logical, etc.) to implement functionalities of the controller 210. If the functionalities of controller 210 are separately performed between the on-board controller 210a and off-board controller 210b, then the at least one hardware processor 211a and the at least one processor 211b would be configured (e.g., programmed) to implement functionalities of the controller 210 respectively performed by the on-board controller 210a and off-board controller 210b.

Each of the at least one hardware processor 211, 211a, 211b may perform its respectively associated functions by executing instructions (in the form of a program or software, for example) stored in a non-transitory computer-readable storage medium, which may be any data storage device that can store data which can be thereafter read by the respective at least one hardware processor.

That is, the non-transitory computer-readable storage medium for the at least one hardware processor 211 may store instruction that, when executed by the at least one hardware processor 211, causes the controller 210 to control components the system 200 to perform the methods, computations, control operations discussed in this disclosure, including the method shown in FIG. 1. Similarly, the respective non-transitory computer-readable storage medium for the at least one hardware processor 211a and the at least one hardware processor 211b may store instruction that, when executed by the respective at least one hardware processor, causes the respective controller (210a or 210b) to perform its respectively associated functions. The program/software implementing the embodiments may also be transmitted over transmission communication media. Examples of the non-transitory computer-readable recording media for any of the at least one hardware processors 211, 211a, 211b include a hard disk drive (HDD) or other magnetic recording apparatus, a solid state drive (SDD) or other solid state storage device, an optical disk, a magneto-optical recording medium, and/or a semiconductor memory (for example, RAM, ROM, etc.). The respective non-transitory computer-readable storage medium may be included in the respective memory 212, 212a, 212b of the respective controller 210, 210a, 210b.

The memory 212, 212a, 212b may include any combination of volatile memory and/or non-volatile memory, and may include memory used in the computations and other operations performed by the respective at least one hardware processor and/or memory that may serve as the non-transitory computer-readable storage medium. The memory 212, 212a, 212b may be used to store any parameter discussed in this disclosure. For example, parameters such as m, b, $k_a$, $k_e$, and $\tau_a$ may be stored prior to the method of FIG. 1.

Any component referred to as a "hardware processor" may include a central processing unit (CPU), a graphics processing unit (GPU), a microcontroller, a microprocessor, and/or a programmable processing component (e.g., a field-programmable gate array (FGPA), and/or an applications-specific integrated circuit (ASIC)). Any component referred to as "at least one hardware processor" may be a plurality of processors in communication with each other through a communication system, such as a controller area network (CAN) bus if the vehicle is embodied as a road vehicle. When a process is performed by a plurality of processors, individual operations within the process may be carried by different individual processors or carried out simultaneously by multiple processors.

Although the processes for backward reachability computation with linear complexity discussed above (including Algorithms 1 and 2) were applied to terminal set $X_\tau$ as defined earlier, this terminal set may be replaced with a different set, according to other embodiments of this disclosure. In other words, the processes for backward reachability computation with linear complexity discussed above (including Algorithms 1 and 2) can be used to calculate backward reachability from an arbitrary set (of system states of the vehicle to which the vehicle is desired to be controlled), without limitation to $X_\tau$. This arbitrary set of system states would replace "$X_\tau$" in Algorithm 1.

EXAMPLES

Figure 7:
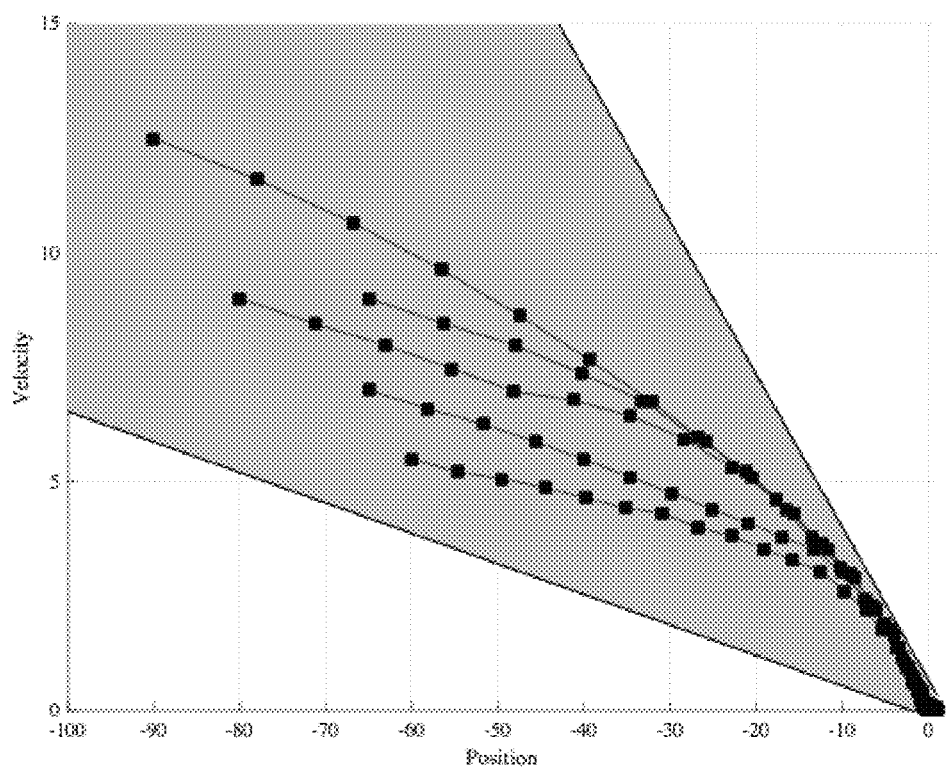
FIG. 7 shows example trajectories of a closed loop system with randomly selected initial states.
Figure 8A:
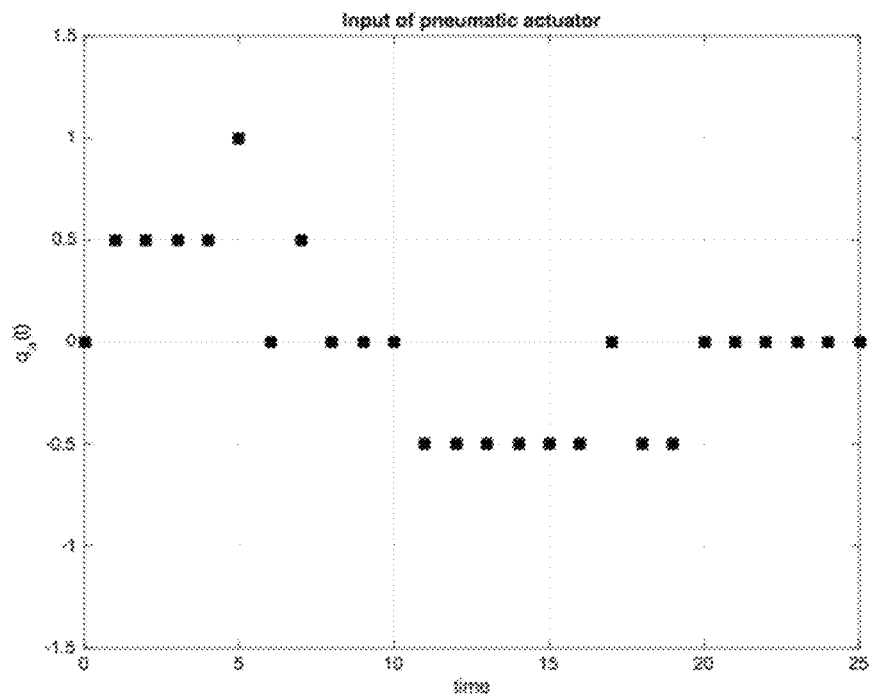
FIGS. 8A-8B show example control inputs, for a pneumatic actuator and an electric actuator of a vehicle, for an example initial system state.
Figure 8B:
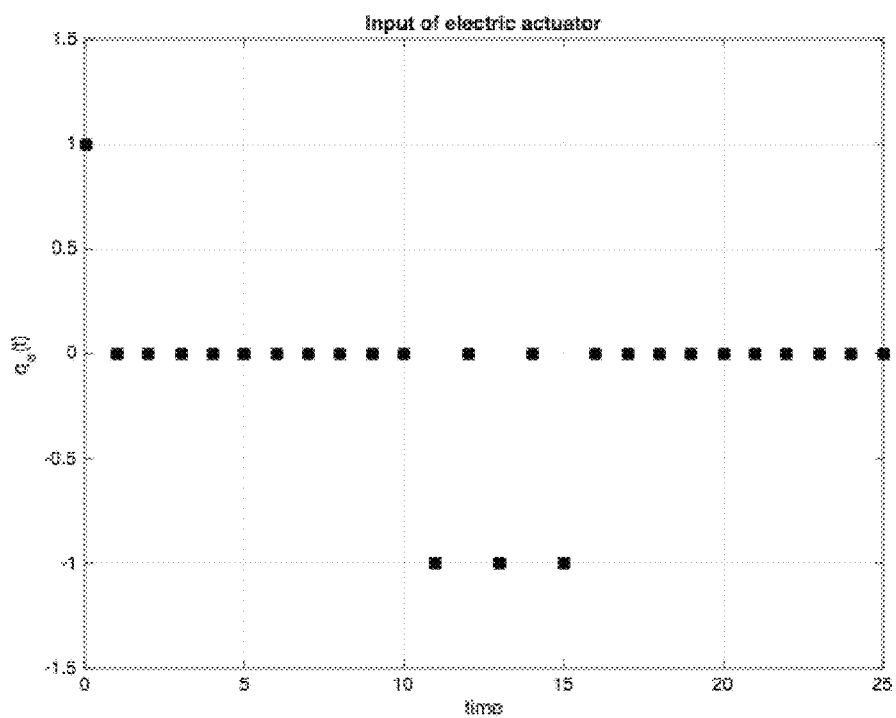

Consider a system (vehicle, such as a train) characterized by the expression of system (1), with parameters: m=1000, b=75, $k_a$=400, $k_e$=200, $\tau_a$=1.5, and a cost function J characterized by (17), where $R=I_{2\times 2}$, L=3, and Q is the zero matrix (no state cost). The discrete-time system (4) is generated by taking the sampling period to be $\Delta t$=1. The target set $\tau$ (2) has the parameters $x_{min}$=2, $x_{max}$=2 and the constraint set X has the parameters $\gamma_{min}$=1/15, $\gamma_{max}$=1/3. As for the parameters for the controller, the time horizon is chosen to be N=20. The terminal set $X_\tau$ and the backward reachable sets $\mathcal{P}^{(1)}$, $\mathcal{P}^{(2)}$, ..., $\mathcal{P}^{(10)}$ are computed accordingly and shown in FIG. 4A and FIG. 6A respectively. FIG. 7 shows example trajectories of the closed loop system with randomly selected initial states. FIG. 8A-8B shows control inputs for x(0)=[-60 5.5 0]$^T$ for the penumatic actuator (FIG. 8A) and for the electric actuator (FIG. 8B).

An example of a computation process for the system (a train) with the parameters, target set $\tau$, and the constraint set X given in the above paragraph is provided below.

First, the matrix "A" in equation (4) is computed as $$A = \begin{bmatrix} 1 & 0.963 & 0.158 \\ 0 & 0.928 & 0.280 \\ 0 & 0 & 0.513 \end{bmatrix}.$$

That is, in the representation of "A" in equation (5), a=0.963, b=0.158, c=0.280, $\lambda_1$=0.928, and $\lambda_2$=0.513.

Figure 9:
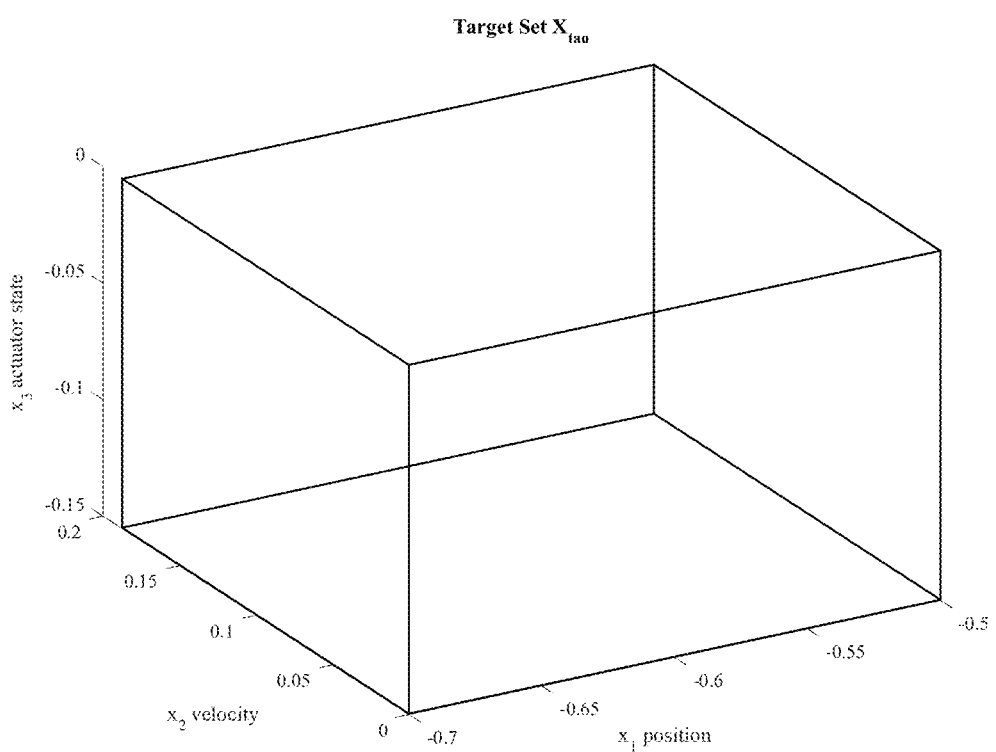
FIG. 9 is a plot of a computed target set in an example computation.

Since the above matrix A satisfies the hypothesis in Lemma 1, the target set $X_\tau$ is constructed. Based on the derivation of Lemma 1, especially equations (9) and (11), choose the parameters for in the form of (6) as follows: $\underline{p}$=0.7, $\bar{p}$=-0.5, $\bar{v}$=-0.1875, q=0.1496. FIG. 9 shows a plot of the computed target set $X_\tau$.

Figure 10A:
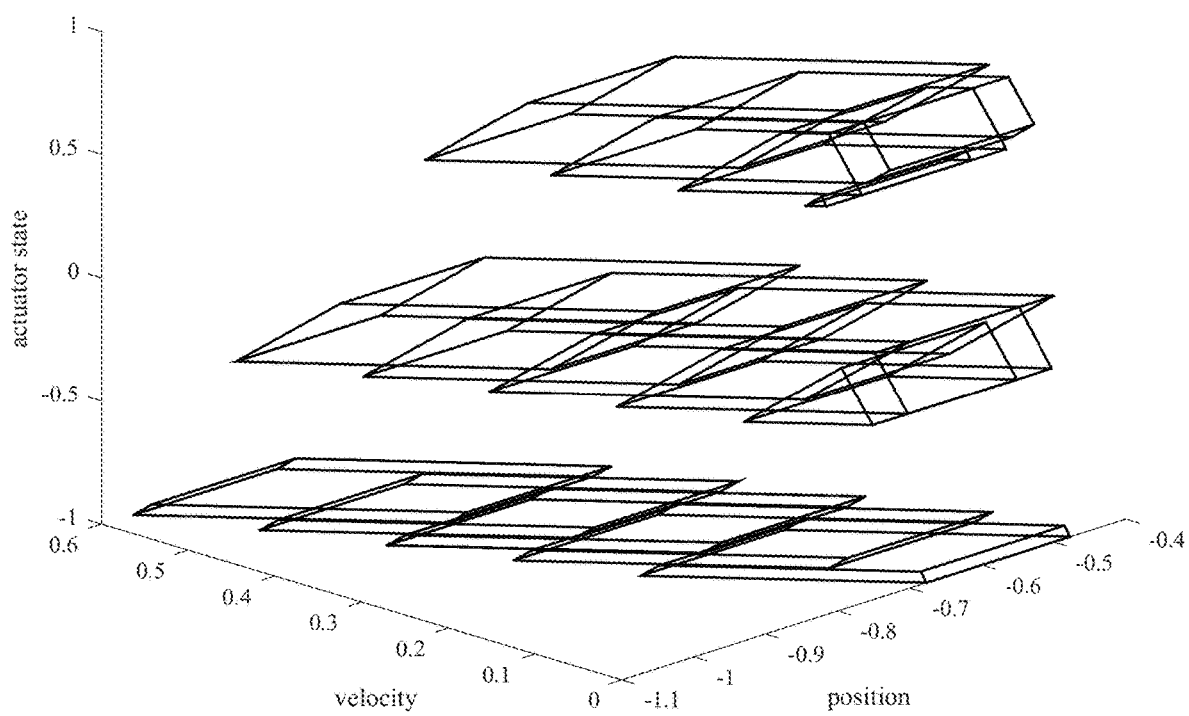
FIGS. 10A-10H are plots illustrating processes pertaining to backward reachability computation in the computation example.

Next, the backward reachable sets are computed based on Algorithm 1. Specifically, as in line 1 in Algorithm 1, initialize $\mathcal{R}^{(0)}=X_\tau$. Next, in accordance with line 3 of Algorithm 1, $\mathcal{R}^{(1)}$ is computed based on equation (14). FIG. 10A shows a plot of $\mathcal{R}^{(1)}$.

Figure 10B:
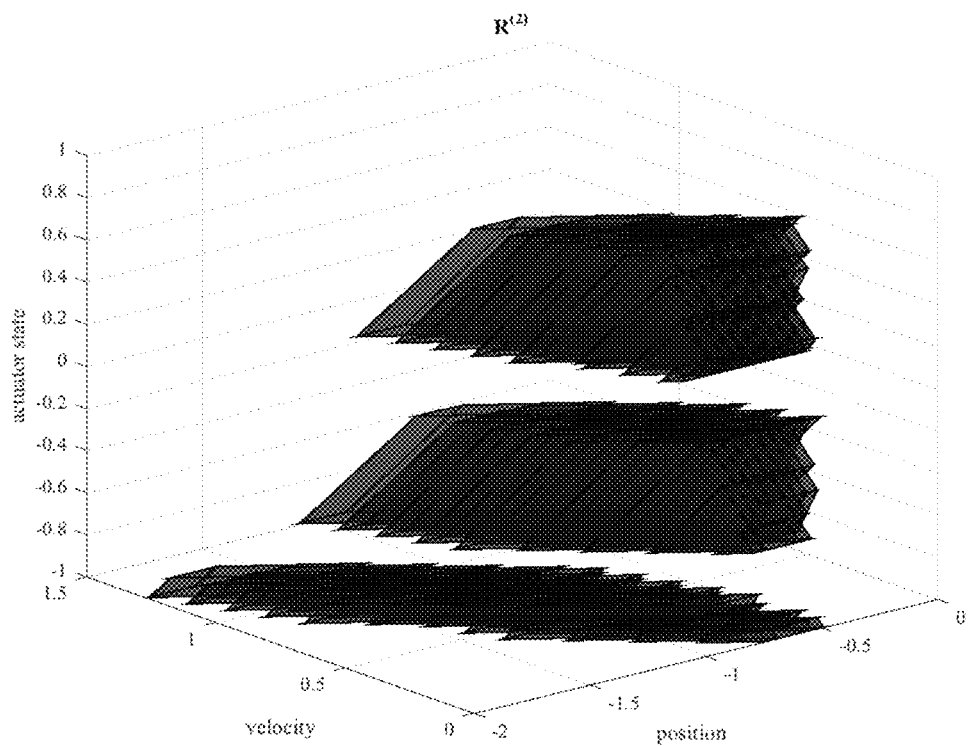
Figure 10C:
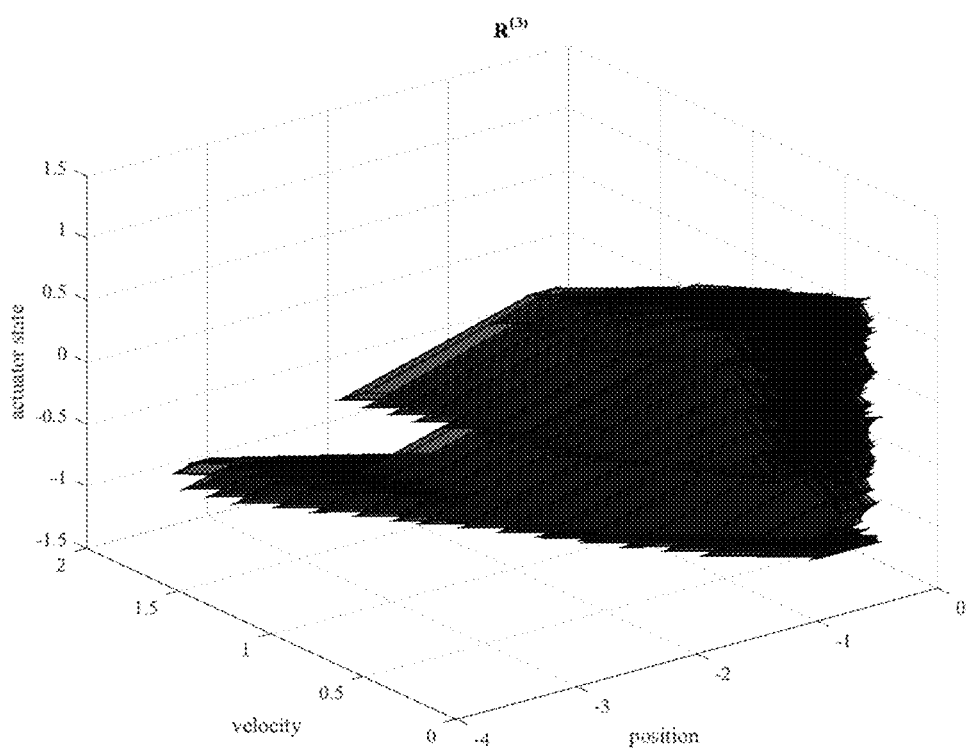

The computation of $\mathcal{R}^{(1)}$ involves elementary polytope operations such as translation and computing the pre-image under a linear transformation, i.e. matrix multiplication. In a similar fashion, $\mathcal{R}^{(2)}$ and $\mathcal{R}^{(3)}$ are computed based on equation (14). FIG. 10B shows a plot of $\mathcal{R}^{(2)}$. FIG. 10C shows a plot of $\mathcal{R}^{(3)}$.

Figure 10D:
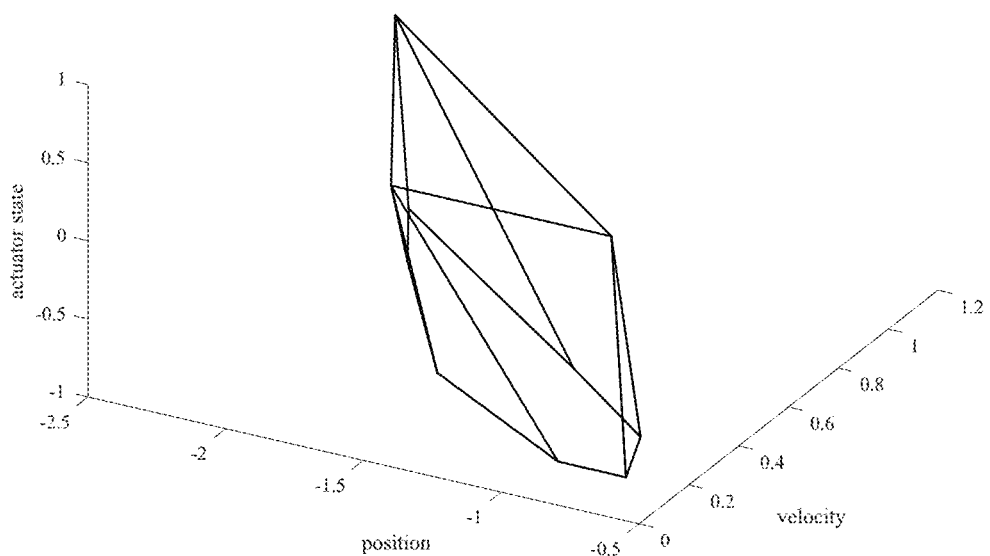

Note that $\mathcal{R}^{(3)}$ is a union of many polytopes. A single polytope $\mathcal{P}^{(1)}$ is used to approximate $\mathcal{R}^{(3)}$ as stated in line 4 of Algorithm 1. Although Algorithm 2 can be used in constructing this approximation, for purposes of illustration, Algorithm 2 is not used in this particular step of this example. The construction of $\mathcal{P}^{(1)}$ is done by inspection of $\mathcal{R}^{(3)}$ and finding a polytope inside this polytope union, while Algorithm 2 will be used in later steps discussed below to automatically generate approximations of polytope unions. FIG. 10D shows a plot of the constructed $\mathcal{P}^{(1)}$ (see also FIG. 5B). It is noted that this construction of $\mathcal{P}^{(1)}$ by inspection of $\mathcal{R}^{(3)}$ is for illustrative purposes. When the process is implemented on a controller, the controller would follow an algorithm, such as Algorithm 2.

Figure 10E:
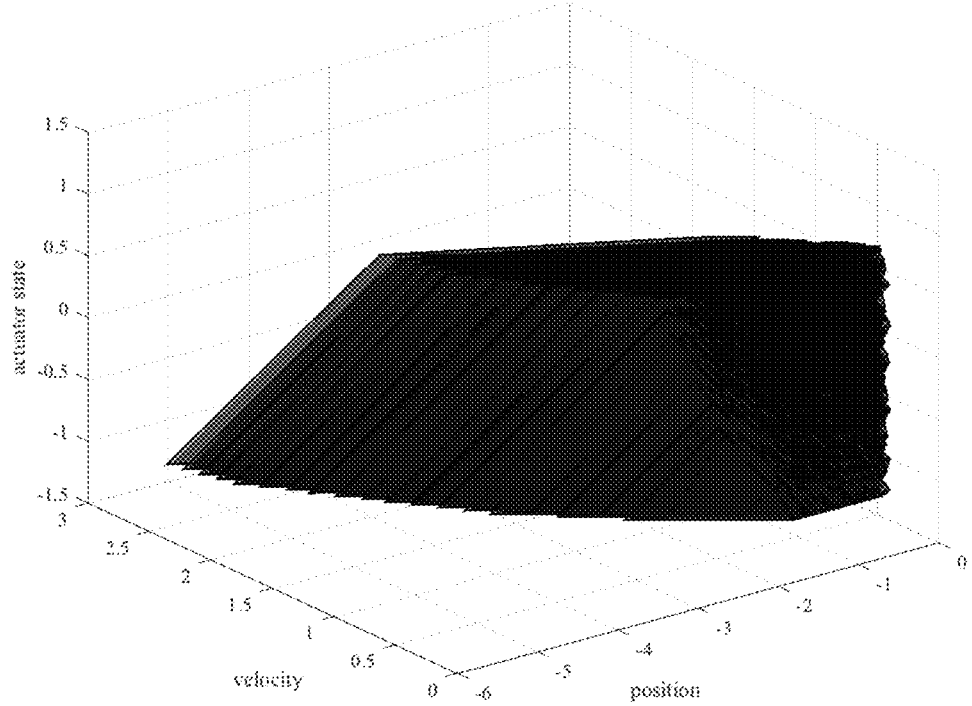

Next, proceeding as in Algorithm 1, lines 5 and 6, $\mathcal{R}^{(0)}$ is set so that $\mathcal{R}^{(0)}=\mathcal{P}^{(1)}$ and k is incremented to 2. Then, as in Algorithm 1, go to the front of the "while" loop in Algorithm 1, line 3, and computing backward reachable sets $\mathcal{R}^{(1)}$ and $\mathcal{R}^{(2)}$ given the updated $\mathcal{R}^{(0)}$. FIG. 10E is a plot of the newly computed $\mathcal{R}^{(2)}$ (see also FIG. 2A).

Note that $\mathcal{R}^{(2)}$ is a union of many polytopes. A single polytope $\mathcal{P}^{(2)}$ is used to approximate $\mathcal{R}^{(2)}$ as stated in line 4 of Algorithm 1. This time, Algorithm 2 is used to compute $\mathcal{P}^{(2)}$.

Figure 10F:
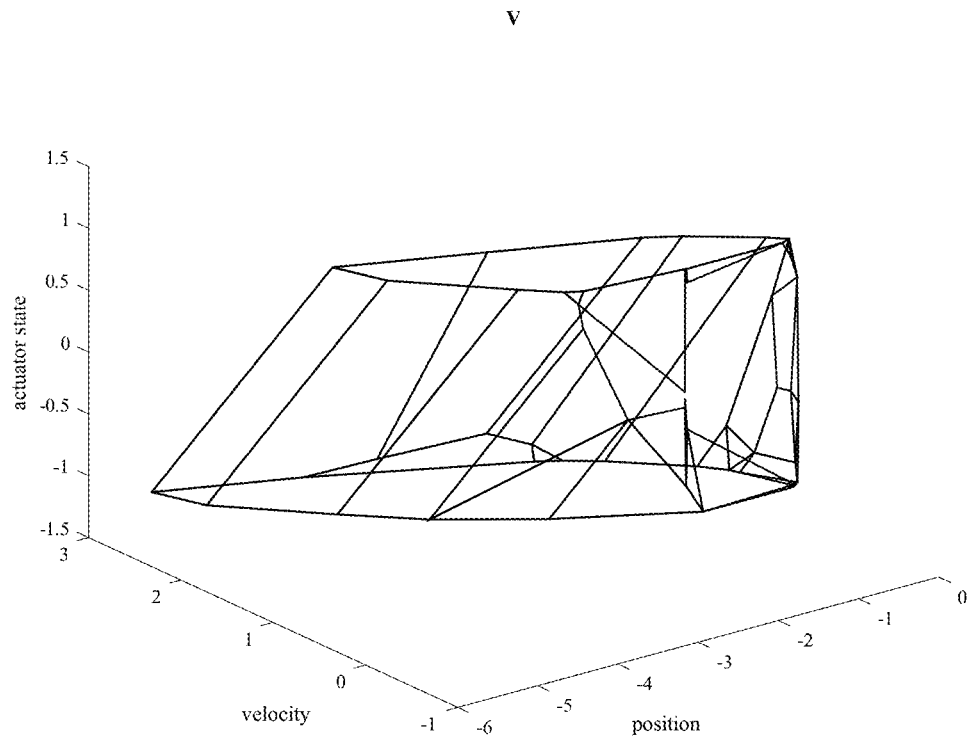

As in line 1 of Algorithm 2, the input is set to be $\mathcal{R}^{(2)}$, which is a union of polytopes. Next, as in line 2 of Algorithm 2, the polytope "V" is constructed, the polytype "V" being centered at the point (−2.22, 0.46, −0.90). FIG. 10F shows a plot of the computed polytope "V".

Figure 10G:
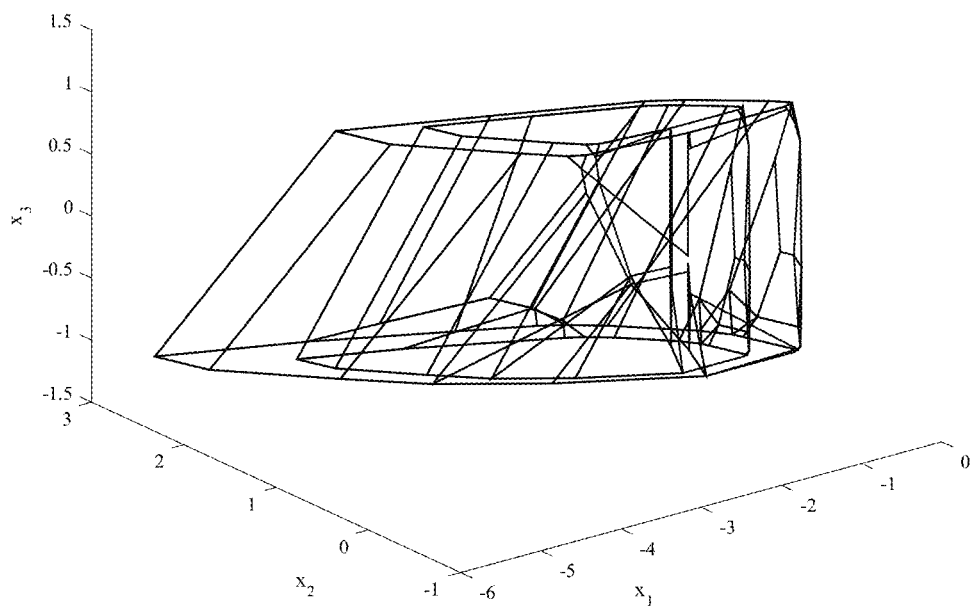

Next, proceeding to the "loop" in Algorithm 2, and line 4 of Algorithm 2, polytyope V was shrunk to a smaller polytope V'. FIG. 10G shows a plot of V', together with original polytope V of FIG. 10F.

There are many ways to shrink a polytope. In this example, the polytope is shrunk with respect to its center point (−2.22, 0.46, −0.90) by multiplying its vertices by a factor of 0.7 along the $x_1$ and $x_2$ axes, while the $x_3$ dimension remains unchanged.

Figure 10H:
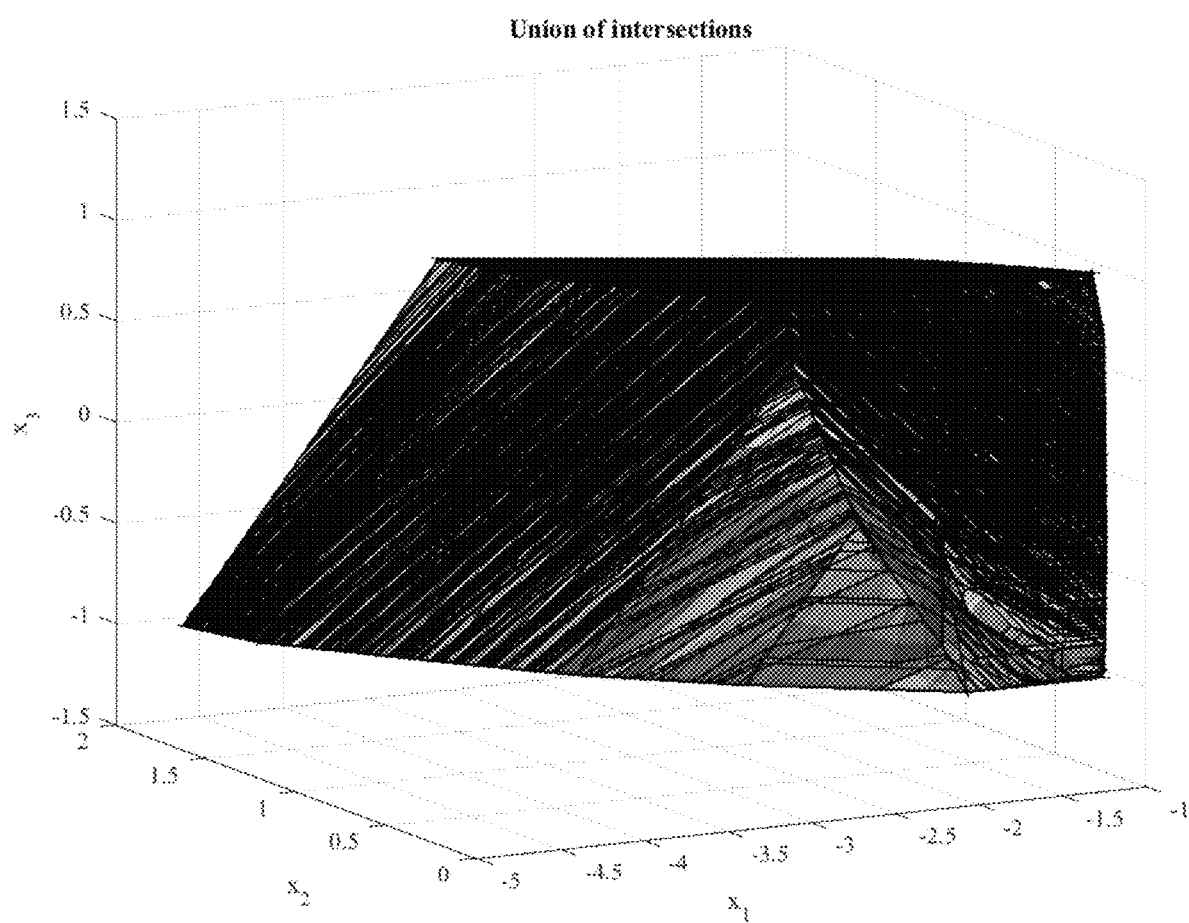

Next, as stated in lines 5 through 8 in Algorithm 2, given the computed V', the intersection of V' with the input Q_i, for all i=1, . . . , 225 (line 5) is computed, and whether the union of these intersections is convex or not is checked (line 6). FIG. 10H is a plot of the union of intersections in the following (each color corresponds to an individual intersection, i.e. one V_iˆ' as in line 5 in Algorithm 2):

In this particular case as shown in FIG. 10H, the union of these intersections is convex. Therefore, the loop exits and the implemented algorithm returns this union of intersections as an approximation of the original input. Note that if the shrinking factor is large (for instance, if the shrinking factors was 0.95 instead of 0.7 for the operation in the line 4 of Algorithm 2), then this union of intersections might not be convex. If the union is not convex, then Algorithm 2 would proceed by shrinking more until the condition in line 6 is satisfied. The "loop" in Algorithm 2 establishes this functionality.

Since the union of these intersections is convex (as shown in the previous plot), it can be represented using a single polytope $\mathcal{P}^{(2)}$ and is returned as an approximation of $\mathcal{R}^{(2)}$, as in line 4 of Algorithm 1.

In a similar fashion as the computation of $\mathcal{P}^{(2)}$, stay within the "while" loop in Algorithm 1 and continue to compute $\mathcal{P}^{(3)}$, $\mathcal{P}^{(4)}$, . . . , $\mathcal{P}^{(10)}$ all of which are computed using Algorithm 2, in a manner similar to the computation of $\mathcal{P}^{(2)}$ (i.e., Algorithm 2 is executed whenever line 4 of Algorithm 1 is encountered). The final result of this computation is shown in FIGS. 5A-5B, discussed earlier.

Next, as in equation (16), the union of $\mathcal{P}^{(1)}$, $\mathcal{P}^{(2)}$, . . . , $\mathcal{P}^{(10)}$ is computed and assigned as the set $\mathcal{C}$, thereby completing the computation of $\mathcal{C}$. Next, for any initial state x(0) within $\mathcal{C}$, a control input sequence is designed such that the soft-landing problem is solved. The computation of the control input is discussed below.

A controller may perform Algorithm 3. In order to perform the algorithm, first compute the cost-to-go function V(x) as defined in equations (19) and (20). Compute V(x) on a grid of the state space, namely $x \in \{x_i^D\}_{i=1}^{N_x}$. Once this computation is complete, these values of the value function may be stored in the computer memory so that the online operations of the controller can access these pre-computed values.

Figure 11A:
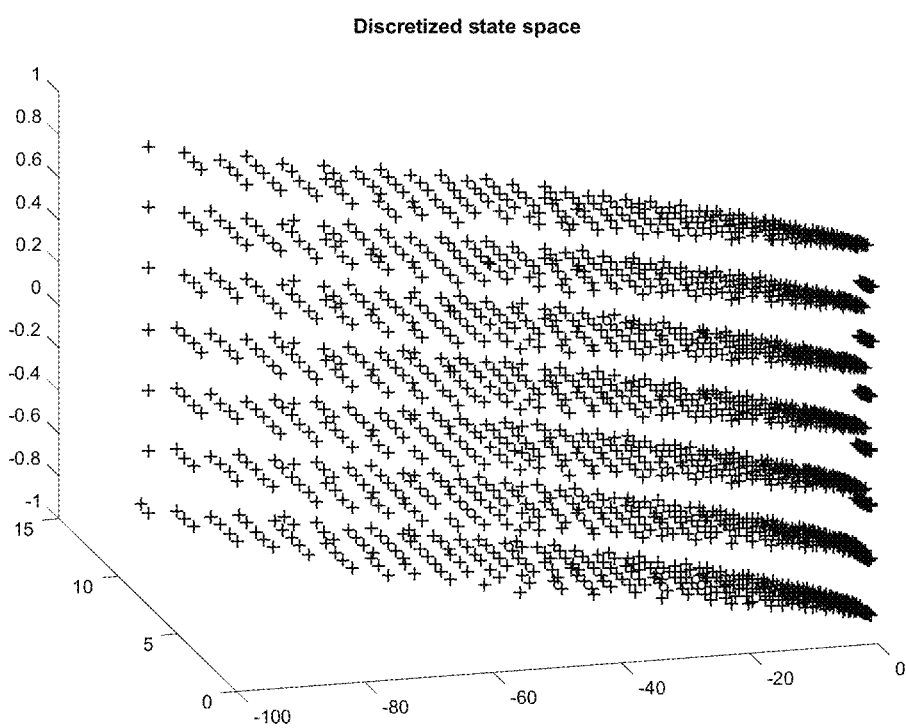
FIG. 11A-11D are plots illustrating processes pertaining to the computation and implementation of control inputs in the computation example.

First, choose a discretization of the state space, i.e., choose the set $\{x_i^D\}_{i=1}^{N_x}$. Choose about 200 points, equally spaced, in each of the sets $\mathcal{P}^{(1)}\backslash X_\tau, \mathcal{P}^{(2)}\backslash \mathcal{P}^{(1)}$, $\mathcal{P}^{(3)}\backslash \mathcal{P}^{(2)}$, . . . , $\mathcal{P}^{(10)}\backslash \mathcal{P}^{(9)}$, so there are about 2000 discrete points. This is the set $\{x_i^D\}_{i=1}^{N_x}$. This discretization is plotted in FIG. 11A (each "+" marker corresponds to one $x_i^D$):

Note that $\{x_i^D\}_{i=1}^{N_x}$ is more dense around the origin, because about 200 points are chosen in both $\mathcal{P}^{(1)}\backslash X_\tau$ and $\mathcal{P}^{(10)}\backslash \mathcal{P}^{(9)}$, but $\mathcal{P}^{(10)}\backslash \mathcal{P}^{(9)}$ is much larger than $\mathcal{P}^{(1)}\backslash X_\tau$.

Next, compute the cost-to-go function V(x) for each point in the set $\{x_i^D\}_{i=1}^{N_x}$. This computation is done recursively, as stated in equations (19) and (20). By (19), every point x in $X_\tau$ is has the cost-to-go function V(x)=0. Next, recall the construction of $\mathcal{P}^{(1)}$ as discussed earlier. For any point x in $\mathcal{P}^{(1)}\backslash X_\tau$, there is an input sequence of length 3 that drives x into the set $X_\tau$. For instance, for the point (−0.922, 0.120, 0.671), which is an element in both $\{x_i^D\}_{i=1}^{N_x}$ and $\mathcal{P}^{(1)}\backslash X_\tau$, under a length 3 input sequence: {[−1 −1]ˆT, [0 1]ˆT, [0 0]ˆT}, the final state (after applying this 3 step input) is: (−0.621, 0.122, −0.037), which is inside the target set $X_\tau$. The cost for this particular input sequence {[−1 −1]ˆT, [0 1]ˆT, [0 0]ˆT} can be computed as (see equation (20), but here, 3 steps are used instead of 2): V(x)=x.'*Q*x+ x_next1.'*Q*x_next1+x_next2.'*Q*x_next2+u1.'*R*u1+ u2.'*R*u2+u3.'*R*u3+3*L, where x=(−0.922, 0.120, 0.671), x_next1=A*x+B*u1, x_next2=A*x_next1+B*u2, u1=[−1 −1]ˆT, u2=[0 1]ˆT, u3=[0 0]ˆT, $$A = \begin{bmatrix} 1 & 0.963 & 0.158 \\ 0 & 0.928 & 0.280 \\ 0 & 0 & 0.513 \end{bmatrix}, B = \begin{bmatrix} 0.0372 & 0.0975 \\ 0.1053 & 0.1927 \\ 0.4866 & 0 \end{bmatrix},$$

Q is the zero matrix, R is the identity matrix, L=3. Consequently, x_next1=(−0.835, 0.001, −0.141), x_next2=(−0.759, 0.154, −0.072), and V(x)=12. In this way, the cost for the point (−0.922, 0.120, 0.671) under the input sequence {[−1 −1]ˆT, [0 1]ˆT, [0 0]ˆT} is computed as 12.

Next, in a similar fashion, enumerate all the possible length-3, length-2, and length-1 input sequences (note that it is possible to drive a point in $\mathcal{P}^{(1)}\backslash X_\tau$ into $X_\tau$ in less than 3 steps), compute the cost for each input sequence, and choose the smallest of these cost as the cost function V(x) for the point (−0.922, 0.120, 0.671). This exact process is described in equation (20) (again, 3 steps are used instead of 2). For the point (−0.922, 0.120, 0.671), the smallest cost is attained under the input sequence {[−1 0]ˆT, [0 0]ˆT}, and the cost for this input sequence is 7, which is less than 12 in the previous calculation. Thus, assign the value 7 as the cost-to-go for the point (−0.922, 0.120, 0.671) and store this value in the computer memory. By repeating this computation for all the points in both $\{x_i^D\}_{i=1}^{N_x}$ and $\mathcal{P}^{(1)}\backslash X_\tau$, the computation for the cost-to-go functions for the set $\mathcal{P}^{(1)}\backslash X_\tau$ is completed. Next, compute the cost-to-go function for the set $\mathcal{P}^{(2)}\backslash \mathcal{P}^{(1)}$.

For every point x in the set $\mathcal{P}^{(2)}\backslash \mathcal{P}^{(1)}$, its cost-to-go function is calculated the same way as it's calculated for a point in the set $\mathcal{P}^{(1)}\backslash X_\tau$, as discussed above. The only difference here is that when calculating the cost, there is an additional term "V(f(f(x, u1), u2))" or "V(f(x,u1))", as stated in expression (21). Since f(f(x, u1), u2) or f(x,u1) is inside $\mathcal{P}^{(1)} \cup X_\tau$, and the cost-to-go function has already been calculated (or defined) on $\mathcal{P}^{(1)}\backslash X_\tau$ and $X_\tau$, the controller can read the computer memory to get the values of either V(f(f(x, u1), u2)) or V(f(x,u1)). For instance, for the point x=(−2.238, 0.696, −0.571) which is in both $\{x_i^D\}_{i=1}^{N_x}$ and $\mathcal{P}^{(2)} \setminus \mathcal{P}^{(1)}$, under a length 2 input sequence: u1=[1 0]^T, u2=[−1 −1]^T, x_next1 and x_next2 are as follows: x_next1=A*x+B*u1=(−1.619, 0.591, 0.193), x_next2=A*x_next1+B*u2=(−1.153, 0.305, −0.387). Since x_next2 is in the set $\mathcal{P}^{(1)}$, the cost-to-go for this particular length-2 is input as: V(x)=x.'*Q*x+x_next1.'*Q*x_next1+u1.'*R*u1+u2.'*R*u2+2*L+V(x_next2), where the term "V(x_next2)" is approximated by $V(x) \approx V(x_{i^*}^D)$ where $i^* = \mathrm{argmin}_i \|x - x_i^D\|$. Particularly, the closest point to x_next2, (−1.153, 0.305, −0.387), in the set $\{x_i^D\}_{i=1}^{N_x}$ is the point $x_{i^*}^D$, (−0.664, 0.040, 0.414), and $V(x_{i^*}^D)$=7.25. Therefore, V(x)=1+2*3+7.25=16.25. In this way, the cost for the point x=(−2.238, 0.696, −0.571) under the input sequence u1=[1 0]^T, u2=[−1 −]^T is computed, and the computed cost is 16.25. Similar to the previous discussion, enumerate all the possible length-2 and length-1 input sequences, compute the cost for each input sequence, and choose the smallest of these cost as the cost function V(x) for the point (−2.238, 0.696, −0.571). In this case, the smallest of these cost is 10.25, which is attained under the length-1 input sequence u1=[0 0]^T. Thus, the value 10.25 is assigned as the cost-to-go for the point (−2.238, 0.696, −0.571) and this value is stored in the computer memory. By repeating this computation for all the points in both $\{x_i^D\}_{i=1}^{N_x}$ and $\mathcal{P}^{(2)} \setminus \mathcal{P}^{(1)}$, the computation for the cost-to-go functions for the set $\mathcal{P}^{(2)} \setminus \mathcal{P}^{(1)}$ is completed.

In the same fashion as the computation of the cost-to-go function on the set $\mathcal{P}^{(2)} \setminus \mathcal{P}^{(1)}$, the cost-to-go function is computed on the sets $\mathcal{P}^{(3)} \setminus \mathcal{P}^{(2)}, \ldots, \mathcal{P}^{(10)} \setminus \mathcal{P}^{(9)}$. This completes the computation of the cost-to-go function V(x) for Algorithm 3.

Figure 11B:
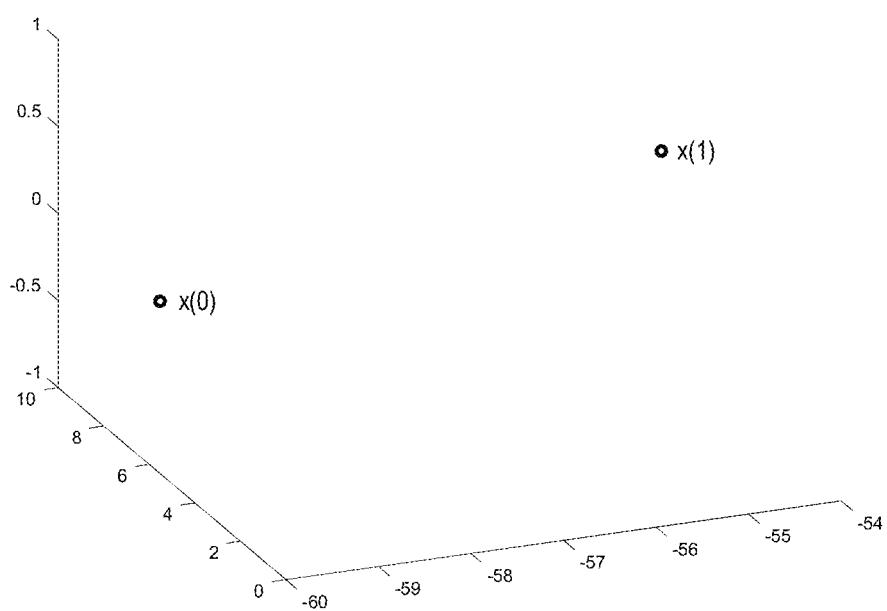

Suppose the vehicle is at an initial state of x(0)=(−60, 5.5, 0), which is not in the target set $X_r$. Next, as stated in line 4 of Algorithm 3, compute that x is in $\mathcal{P}^{(10)}$, i.e. k=10. Next, as stated in line 5 of Algorithm 3, enumerate all possible length-2 and length-1 input sequences and find the one that minimizes the cost-to-go function V(x) as defined in equation (20). In this case, the minimizing control input sequence is the length-1 input: u1=[1 0]^T. Under this input, the state transition to the point x(1)=A*x(0)+B*u1=(−54.663, 5.207, 0.486). This state transition is plotted in FIG. 11B, which shows x(0) and x(1) as plotted points.

Figure 11C:
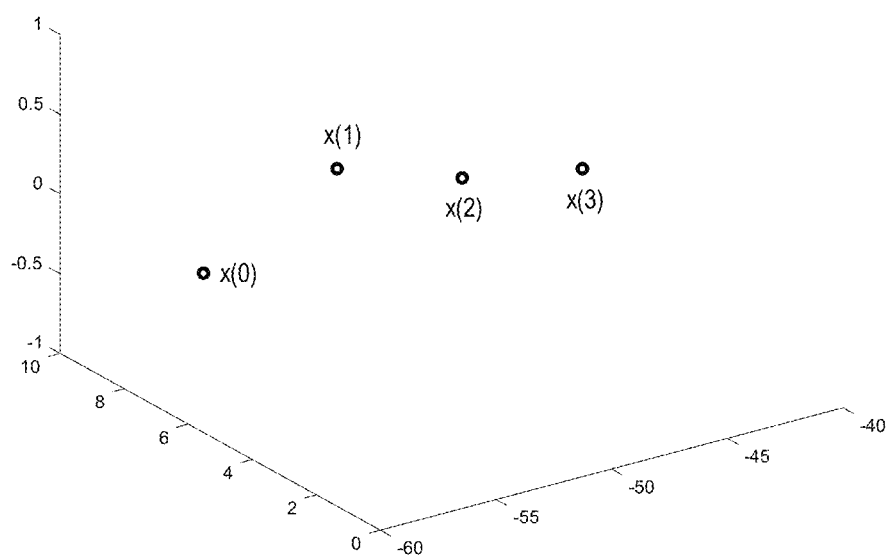

Next, as in line 7 in Algorithm 3, update x(1) to x. Since x(1) is not in the target set, stay within the while loop and goes to line 4 of Algorithm 3. Compute that x(1) is in $\mathcal{P}^{(9)}$, and the next optimal control input sequence is a length-2 input: u1=[0 0.5]^T, u2=[0 0.5]^T. Apply this input to the state x(1), and compute the next states: x(2)=(−49.521, 5.064, 0.249), and x(3)=(−44.553, 4.864, 0.128). This state transition is plotted in FIG. 11C, in which x(0), x(1), x(2), and x(3) are plotted.

Figure 11D:
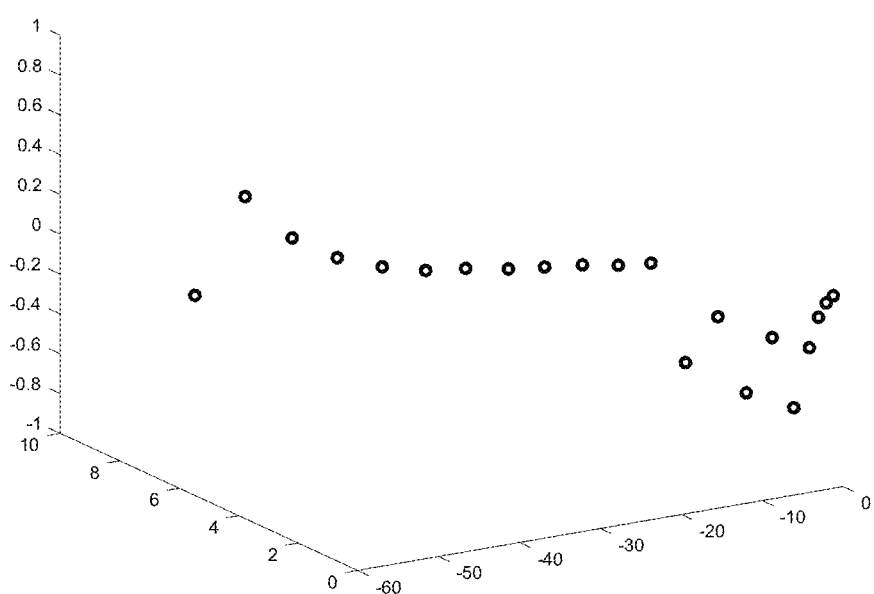

The above process is repeated until the state reaches the target set $X_r$. The state trajectory is plotted in FIG. 11D.

The optimal control input sequence for this example scenario can be found in FIGS. 8A-8B, and the projection of the state trajectory on position-velocity plan can be found in FIG. 7. Once the state reaches the target set $X_r$, apply a constant zero input afterwards, as in line 9 of Algorithm 3. This completes the controller implementation, and the soft-landing problem is solved.

Although certain embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a vehicle to soft-land at a target destination represented by a target set, the vehicle being controllable according to a control input set, the method being performed by one or more controllers and comprising:
    determining a terminal set of system states of the vehicle under which the vehicle will converge to the target set under a constant zero control input state, each of the system states of the terminal set including a position-and-velocity state of the vehicle that is within a state constraint set, the state constraint set defining minimum and maximum velocities of the vehicle to reach the target set from respective positions;
    determining a sequence of polytopes, each of the polytopes representing a respective plurality of system states of the vehicle that are backward reachable from a respective target-state set, which is the terminal set for a first polytope in the sequence and is a previous-in-sequence polytope for each subsequent polytope in the sequence, wherein
        each respective polytope in the sequence of polytopes is determined by a polytope-determining process comprising
            determining a backward reachable set from which the respective target-state set is reachable by an input or a sequence of inputs within the control input set, and
            approximating the backward reachable set with an approximate polytope that is a subset of the backward reachable set, the approximate polytope being determined as the respective polytope in the sequence of polytopes, and
        the determined sequence of polytopes includes a polytope including a current system state of the vehicle;
    controlling the vehicle to drive the vehicle from the current system state, through a trajectory of system states of the vehicle, and to a state in the terminal set, the trajectory passing through system states of the vehicle respectively represented by polytopes of a reverse sequence of the sequence of polytopes; and
    upon determining that the vehicle has reached the terminal set, controlling the vehicle to a constant zero control input state such that the vehicle arrives at the target set.

2. The method according to claim 1, wherein
    the vehicle comprises one or more engine and brake systems, each having a quantized input,
    the control input set is a set of all combinations of input states of the one or more engine and brake systems, and
    each system state, among the system states of the vehicle of the terminal set and among the plurality of system states represented by each of the polytopes in the sequence of polytopes, includes a position-and-velocity state of the vehicle and a state of at least one of the one or more engine and brake systems.

3. The method according to claim 2, wherein
    the vehicle is a train moving along a fixed track, and
    the one or more engine and brake systems comprises two engine and brake systems.

4. The method according to claim 1, wherein, in the polytope-determining process,
    the backward reachable set is a union of polytopes, and
    the approximating the backward reachable set comprises:
        determining a convex hull of polytopes in the union of polytopes;

determining a reduced-size polytope by shrinking the convex hull into the reduced-size polytope;
determining intersections of polytopes in the union of polytopes with the reduced-size polytope;
determining whether a union of the intersections is convex; and
upon determining that the union of the intersections is convex, determining the union of intersections as the approximate polytope.

5. The method according to claim 1, wherein, in the polytope-determining process, the determining the backward reachable set comprises:
determining a first backward reachable set from which the respective target-state set is reachable by one or more inputs within the control input set; and
determining a second backward reachable set from which the first backward reachable set is reachable by one or more inputs within the control input set,
the second backward reachable being determined as the backward reachable set used in the approximating the backward reachable set.

6. The method according to claim 1, wherein the controlling the vehicle comprises controlling the vehicle to transition system states by:
determining that a current system state of the vehicle is within a polytope $\mathcal{P}^{(k)}$, which is a polytope in the sequence of polytopes; and
controlling the vehicle to drive the vehicle from the current system state to a new system state within the respective target-state set of the polytope $\mathcal{P}^{(k)}$.

7. The method according to claim 1, comprising, for each respective polytope in the sequence of polytopes:
selecting a plurality of state-space points in a state space within the respective polytope; and
for each respective state-space point among the plurality of state-space points, determining a minimum cost-to-go function among cost-to-go functions among all possible inputs to sequences of the state-space points within a predetermined length, to drive the vehicle from the respective point to a system state of the vehicle within the respective target-state set of the respective polytope, each of the inputs to all possible sequences of the state-space points being within the control input set.

8. The method according to claim 7, wherein the controlling the vehicle to drive the vehicle comprises controlling the vehicle to transition from one system state to another system state by:
determining that a current system state of the vehicle is represented by a state-space point among the respective plurality of state-space points in a polytope $\mathcal{P}^{(k)}$ in the sequence of polytopes;
determining a control input sequence corresponding to the minimum cost-to-go function for the state-space point representing the current system state; and
controlling the vehicle to drive the vehicle from the current system state to a new system state within the respective target-state set of the polytope $\mathcal{P}^{(k)}$, by applying the control input to drive the vehicle.

9. The method according to claim 8, wherein the controlling the vehicle to drive the vehicle comprises repeatedly performing the controlling the vehicle to transition system states until the new system state is included in the terminal set.

10. The method according to claim 1, wherein
the one or more controllers comprise a controller off-board the vehicle and a controller on-board the vehicle,
the determining the terminal set and the determining the sequence of polytopes are performed by the controller off-board the vehicle, and
the controlling the vehicle to drive the vehicle and the controlling the vehicle to the constant zero control input state are performed by the controller on-board the vehicle.

11. A system to control a vehicle to soft-land at a target destination represented by a target set, the vehicle being controllable according to a control input set, the system comprising:
one or more controllers configured to perform operations including:
determining a terminal set of system states of the vehicle under which the vehicle will converge to the target set under a constant zero control input state, each of the system states of the terminal set including a position-and-velocity state of the vehicle that is within a state constraint, the state constraint set defining minimum and maximum velocities of the vehicle to reach the target set from respective positions;
determining a sequence of polytopes, each of the polytopes representing a respective plurality of system states of the vehicle that are backward reachable from a respective target-state set, which is the terminal set for a first polytope in the sequence and is a previous-in-sequence polytope for each subsequent polytope in the sequence, wherein
each respective polytope in the sequence of polytopes is determined by a polytope-determining process comprising
determining a backward reachable set from which the respective target-state set is reachable by an input or a sequence of inputs within the control input set, and
approximating the backward reachable set with an approximate polytope that is a subset of the backward reachable set, the approximate polytope being determined as the respective polytope in the sequence of polytopes, and
the determined sequence of polytopes includes a polytope including a current system state of the vehicle;
controlling the vehicle to drive the vehicle from the current system state, through a trajectory of system states of the vehicle, and to a state in the terminal set, the trajectory passing through system states of the vehicle respectively represented by polytopes of a reverse sequence of the sequence of polytopes; and
upon determining that the vehicle has reached the terminal set, controlling the vehicle to a constant zero control input state such that the vehicle arrives at the target set.

12. The system according to 11, wherein, in the polytope-determining process,
the backward reachable set is a union of polytopes, and
the approximating the backward reachable set comprises:
determining a convex hull of polytopes in the union of polytopes;
determining a reduced-size polytope by shrinking the convex hull into the reduced-size polytope;
determining intersections of polytopes in the union of polytopes with the reduced-size polytope;

determining whether a union of the intersections is convex; and upon determining that the union of the intersections is convex, determining the union of intersections as the approximate polytope.

13. The system according to 11, wherein, in the polytope-determining process, the determining the backward reachable set comprises:

determining a first backward reachable set from which the respective target-state set is reachable by one or more inputs within the control input set; and determining a second backward reachable set from which the first backward reachable set is reachable by one or more inputs within the control input set, the second backward reachable being determined as the backward reachable set used in the approximating the backward reachable set.

14. The system according to 11, wherein the controlling the vehicle comprises controlling the vehicle to transition system states by:

determining that a current system state of the vehicle is within a polytope $\mathcal{P}^{(k)}$, which is a polytope in the sequence of polytopes; and controlling the vehicle to drive the vehicle from the current system state to a new system state within the respective target-state set of the polytope $\mathcal{P}^{(k)}$.

15. The system according to 11, wherein the operations comprise, for each respective polytope in the sequence of polytopes:

selecting a plurality of state-space points in a state space within the respective polytope; and for each respective state-space point among the plurality of state-space points, determining a minimum cost-to-go function among cost-to-go functions among all possible sequences, within a predetermined length, of inputs to drive the vehicle from the respective point to a system state of the vehicle within the respective target-state set of the respective polytope, each of the all possible sequences of inputs comprising inputs within the control input set.

16. The system according to 15, wherein the controlling the vehicle to drive the vehicle comprises controlling the vehicle to transition from one system state to another system state by:

determining that a current system state of the vehicle is represented by a state-space point among the respective plurality of state-space points in a polytope $\mathcal{P}^{(k)}$ in the sequence of polytopes;

determining a control input sequence corresponding to the minimum cost-to-go function for the state-space point representing the current system state; and controlling the vehicle to drive the vehicle from the current system state to a new system state within the respective target-state set of the polytope $\mathcal{P}^{(k)}$, by applying the control input to drive the vehicle.

17. The system according to 16, wherein the controlling the vehicle to drive the vehicle comprises repeatedly performing the controlling the vehicle to transition system states until the new system state is included in the terminal set.

18. The system according to 11, wherein the one or more controllers comprise:

a controller off-board the vehicle, configured to perform the determining the terminal set and the determining the sequence of polytopes; and a controller on-board the vehicle, configured to perform the controlling the vehicle to drive the vehicle and the controlling the vehicle to the constant zero control input state are performed.

19. A method performed by a controller of a system to control a vehicle to soft-land at a target destination, the method comprising:

determining a terminal set of system states of the vehicle under which the vehicle will converge to a target set under a constant zero control input state, each of the system states of the terminal set including a position-and-velocity state of the vehicle that is within a state constraint set, wherein the target set represents a target destination at which the vehicle is to soft-land, and the state constraint set defines minimum and maximum velocities of the vehicle to reach the target set from respective positions.

20. The method according to claim 19, wherein each of the system states of the vehicle includes a position state of the vehicle that is greater than or equal to a lower bound position $-\underline{p}$ and less than or equal to an upper bound position $\bar{p}$, a velocity state of the vehicle that is greater than or equal to zero and less than a upper bound velocity $\bar{v}$, and a state of an engine and brake system of the vehicle that is greater than or equal to a lower bound parameter $-\underline{q}$ and less than or equal to zero, and the determining the terminal set comprises:

determining a matrix A $$A = \begin{bmatrix} 1 & a & b \\ 0 & \lambda_1 & c \\ 0 & 0 & \lambda_2 \end{bmatrix}$$

satisfying the following system dynamics equation:

$$\begin{bmatrix} x_{m,1}(k+1) \\ x_{m,2}(k+1) \\ x_q(k+1) \end{bmatrix} = A \begin{bmatrix} x_{m,1}(k) \\ x_{m,2}(k) \\ x_q(k) \end{bmatrix} + B \begin{bmatrix} q_e(k) \\ q_a(k) \end{bmatrix}$$

where:

$x_{m,1}(k)$ and $x_{m,1}(k)$ are position and velocity states of the vehicle at time k, respectively, $x_q(k)$ and $q_a(k)$ are the state and the control input of the engine and brake system of the vehicle, respectively, at time k, $q_e(k)$ is a control input of another engine and brake system of the vehicle at time k, and B is a matrix; and selecting values of $\underline{p}, \bar{p}, \bar{v}$, and $\underline{q}$ such that $$-\underline{p} - a\frac{1}{1-\lambda_1}\left(\frac{c\underline{q}}{1-\lambda_2/\lambda_1}\right) - b\frac{1}{1-\lambda_2}\underline{q} > x_{min}$$

and $$\bar{p} + a\frac{1}{1-\lambda_1}\bar{v} < x_{max}$$

where $x_{min}$, is a minimum position of the target set and $x_{max}$ is a maximum position of the target set.

\* \* \* \* \*